United States Patent
Takahashi

[11] Patent Number: 5,914,928
[45] Date of Patent: Jun. 22, 1999

[54] INFORMATION RECORDING DISK HAVING REPLACEMENT AREA

[75] Inventor: Hideki Takahashi, Nagareyama, Japan

[73] Assignee: Kabushiki Kaisha Toshiba, Kawasaki, Japan

[21] Appl. No.: 09/110,996

[22] Filed: Jul. 6, 1998

Related U.S. Application Data

[62] Division of application No. 08/822,713, Mar. 24, 1997, abandoned.

[30] Foreign Application Priority Data

Mar. 25, 1996 [JP] Japan .................................. 8-068524

[51] Int. Cl.$^6$ ....................................................... G11B 7/00
[52] U.S. Cl. ............................... 369/58; 369/47; 369/59; 369/275.3
[58] Field of Search ................................. 369/47, 48, 49, 369/50, 54, 58, 59, 60, 32, 275.1, 275.3

[56] References Cited

U.S. PATENT DOCUMENTS

| | | |
|---|---|---|
| 4,774,700 | 9/1988 | Satoh et al. . |
| 5,241,531 | 8/1993 | Ohno et al. ............................ 369/59 X |
| 5,271,018 | 12/1993 | Chan . |
| 5,319,627 | 6/1994 | Shinno et al. . |
| 5,343,453 | 8/1994 | Ogino . |
| 5,541,903 | 7/1996 | Funahashi et al. . |
| 5,574,708 | 11/1996 | Kawakami . |
| 5,623,470 | 4/1997 | Asthana et al. ........................... 369/58 |
| 5,715,221 | 2/1998 | Ito et al. . |
| 5,805,547 | 9/1998 | Yamamuro ................................ 369/58 |

FOREIGN PATENT DOCUMENTS

| | | |
|---|---|---|
| 62-137744 | 6/1987 | Japan . |
| 63-29338 | 2/1988 | Japan . |
| 2-44578 | 2/1990 | Japan . |
| 4-103047 | 4/1992 | Japan . |
| 06231502 | 8/1994 | Japan . |

OTHER PUBLICATIONS

Hashimoto, Japanese patent abstract for 4–114371, filed Sep. 5, 1990, published Apr. 15, 1992.
Toshiba Coporation, partial translation of Japanese patent application 8–129458, filed Oct. 31, 1994, published May 21, 1996.
Takeshi, Japanese patent abstract for 4–345968, filed May 23, 1991, published Dec. 1, 1992.
Hiroyuki, Japanese patent abstract for 8–045194, filed Jul. 29, 1994, published Feb. 16, 1996.
Tsukasa, Japanese patent abstract for 2–179970, filed Jan. 5, 1989, published Jul. 12, 1990.

*Primary Examiner*—Muhammad N. Edun
*Attorney, Agent, or Firm*—Pillsbury Madison & Sutro LLP

[57] ABSTRACT

A disk which is rotated at one of a plurality of rotation speeds to record information is used. This disk includes a data area formed spirally or concentrically with a center of rotation, in which information is recorded when the disk is being rotated at the rotation speed and a replacement area formed spirally or concentrically with the center of rotation of the disk on a side farther to the center of rotation of the disk than the data area, in which, upon detecting a write error in the data area during rotation of the disk at the rotation speed, information indicating generation of the write error is replaced and recorded at the rotation speed.

32 Claims, 23 Drawing Sheets

| RECORD MAP(1) (INNER SIDE OF REPLACEMENT AREA) | RECORD MAP(2) (OUTER SIDE OF REPLACEMENT AREA) | TRACK NO. | ROTATION SPEED |
|---|---|---|---|
| REPLACEMENT AREA RA1 | | #001 #002 | N1 |
| DATA AREA DA1 | DATA AREA DA1 | #098 | N1 |
| | REPLACEMENT AREA RA1 | #099 #100 | |
| REPLACEMENT AREA RA2 | | #101 #102 | N2 |
| DATA AREA DA2 | DATA AREA DA2 | #198 | N2 |
| | REPLACEMENT AREA RA2 | #199 #200 | |
| REPLACEMENT AREA RA3 | | #201 #202 | N3 |
| DATA AREA DA3 | DATA AREA DA3 | #289 | N3 |
| | REPLACEMENT AREA RA3 | #299 #300 | |
| REPLACEMENT AREA RA4 | | #301 #302 | N4 |
| DATA AREA DA4 | DATA AREA DA4 | #398 | N4 |
| | REPLACEMENT AREA RA4 | #399 #400 | |

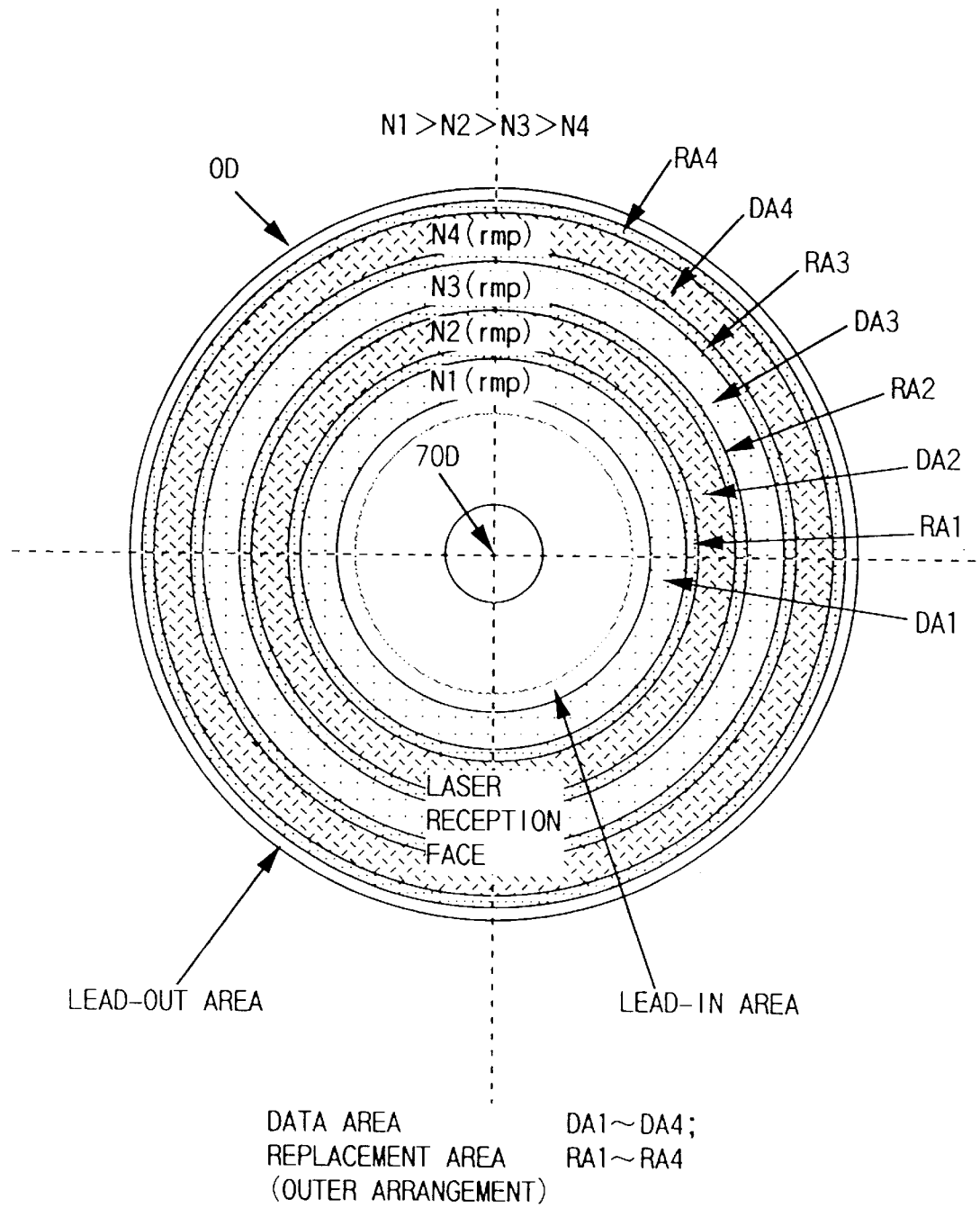
F I G. 6

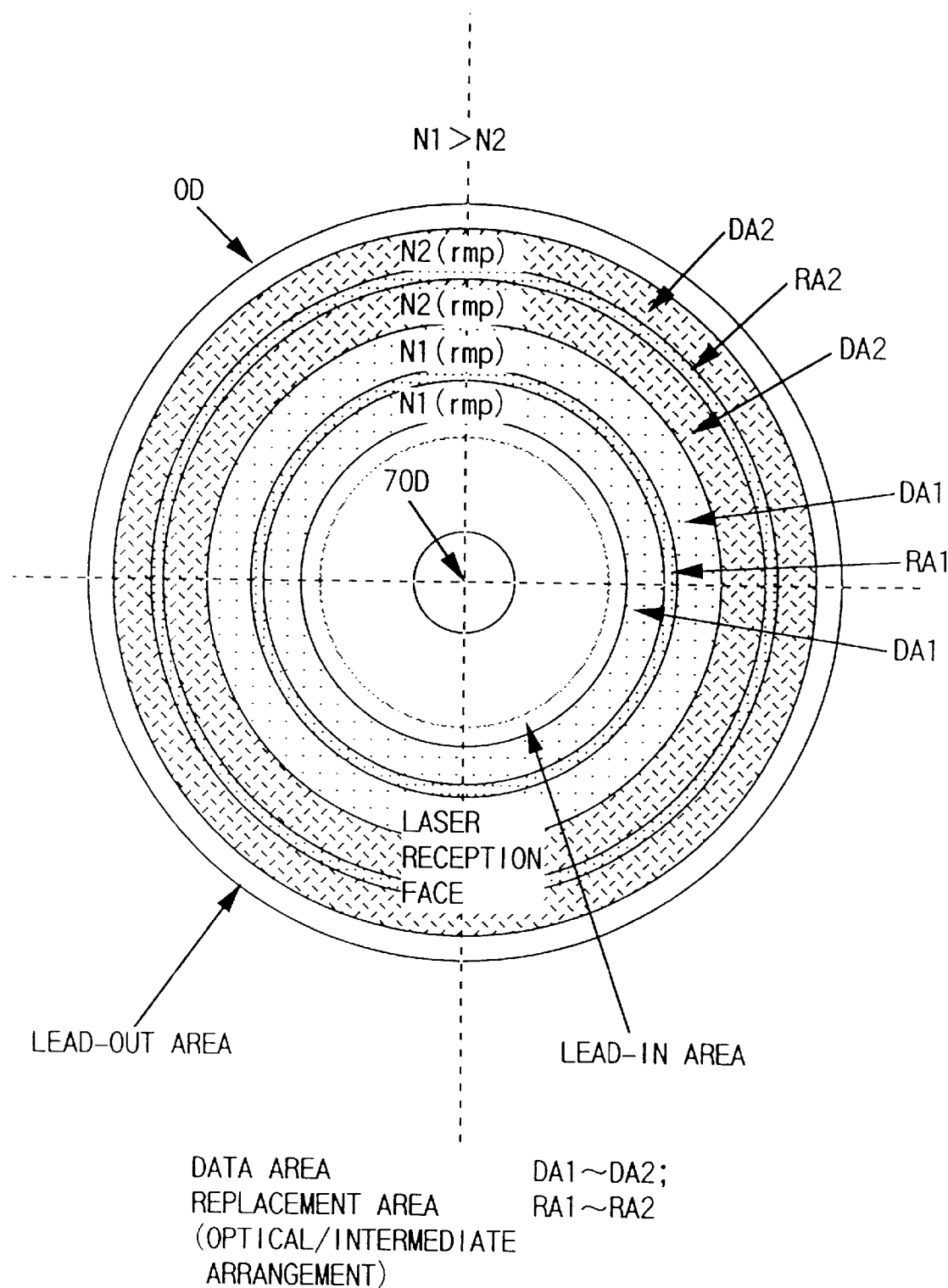
F I G. 7

| RECORD MAP(1) (INNER SIDE OF REPLACEMENT AREA) | RECORD MAP(2) (OUTER SIDE OF REPLACEMENT AREA) | TRACK NO. | ROTATION SPEED |
|---|---|---|---|
| REPLACEMENT AREA RA1 | | #001 #002 | N1 |
| DATA AREA DA1 | DATA AREA DA1 | #098 | N1 |
| | REPLACEMENT AREA RA1 | #099 #100 | N1 |
| REPLACEMENT AREA RA2 | | #101 #102 | N2 |
| DATA AREA DA2 | DATA AREA DA2 | #198 | N2 |
| | REPLACEMENT AREA RA2 | #199 #200 | N2 |
| REPLACEMENT AREA RA3 | | #201 #202 | N3 |
| DATA AREA DA3 | DATA AREA DA3 | #289 | N3 |
| | REPLACEMENT AREA RA3 | #299 #300 | N3 |
| REPLACEMENT AREA RA4 | | #301 #302 | N4 |
| DATA AREA DA4 | DATA AREA DA4 | #398 | N4 |
| | REPLACEMENT AREA RA4 | #399 #400 | N4 |

F I G. 8

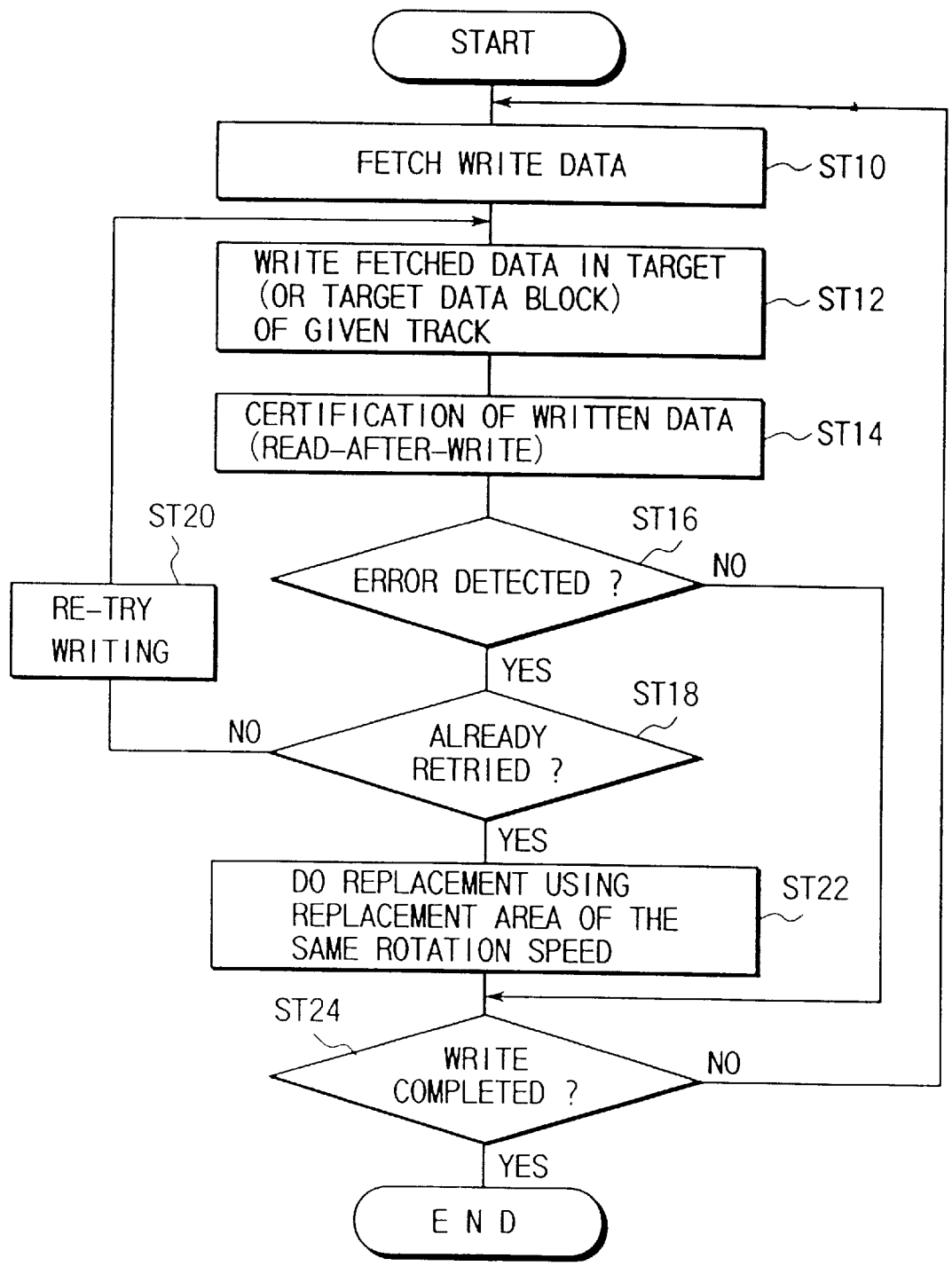
F I G. 9

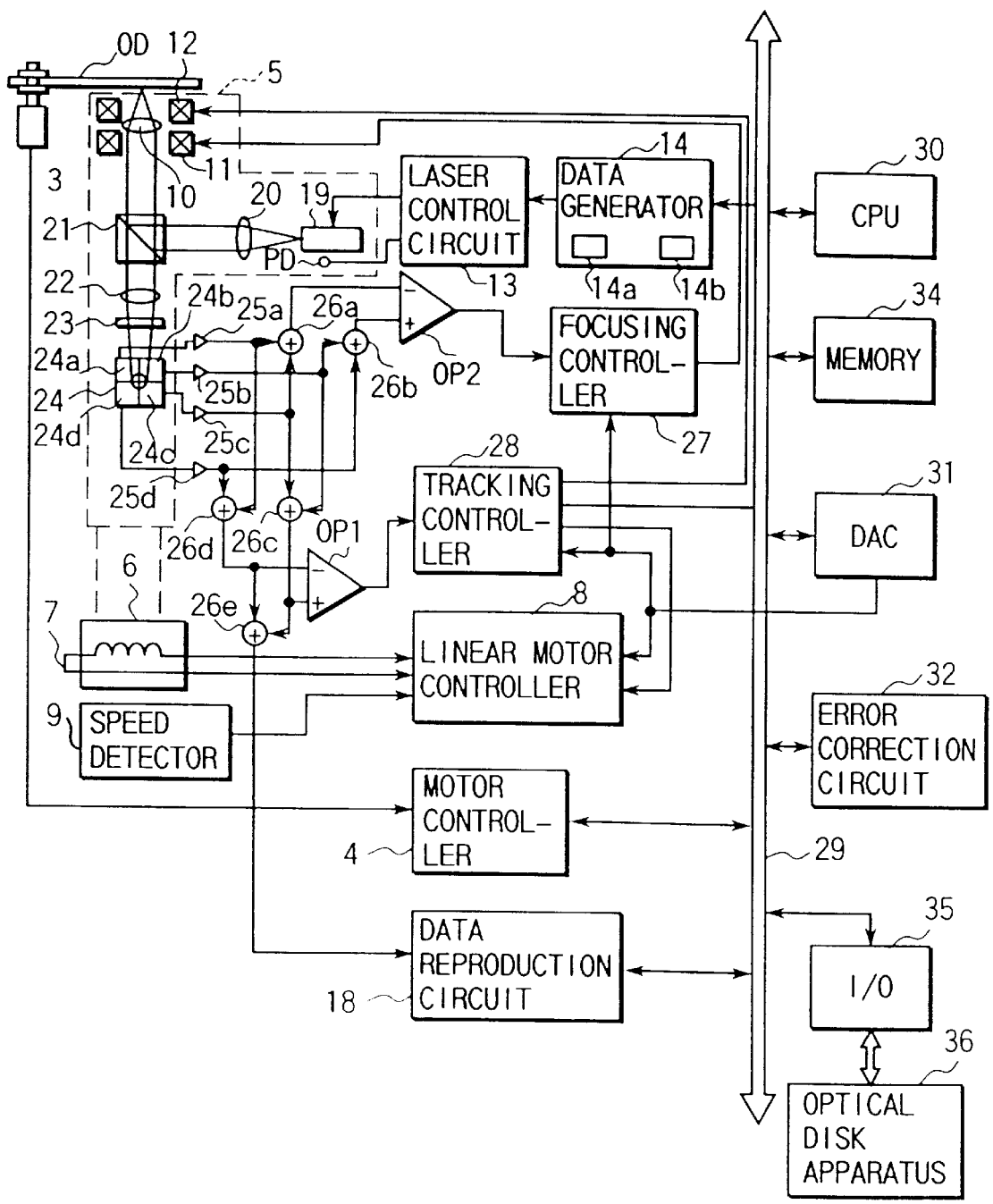
F I G. 10

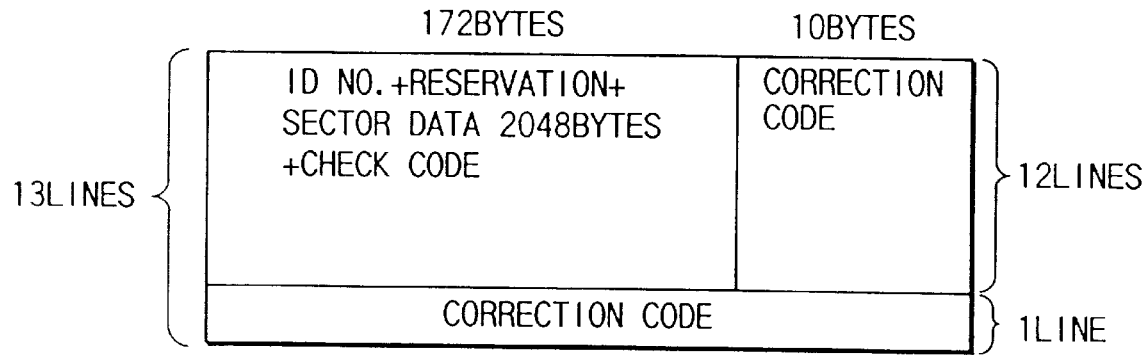
F I G. 1 5
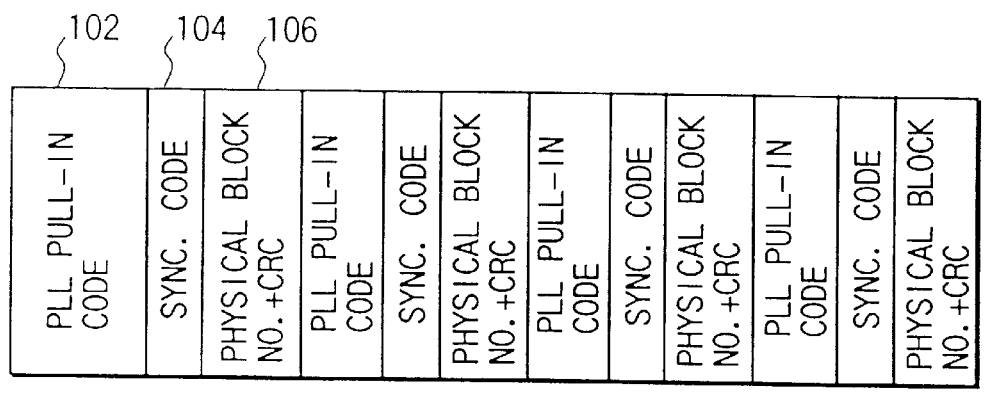
F I G. 1 6
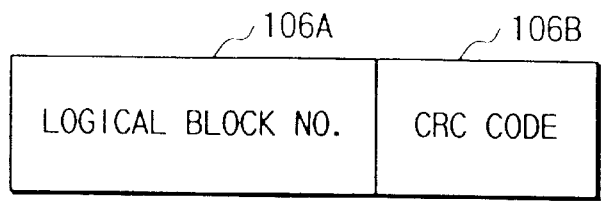
F I G. 1 7

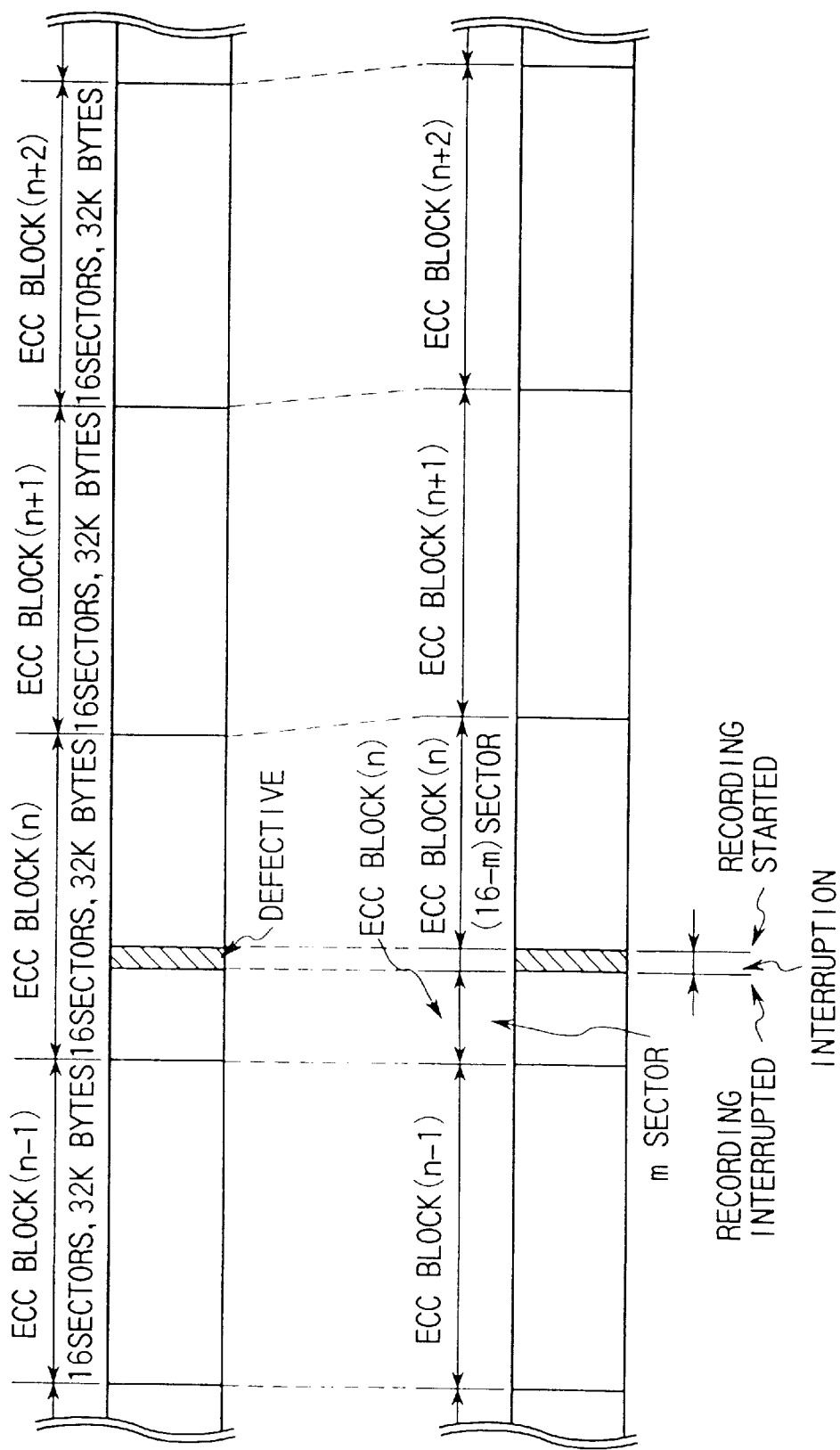
F I G. 19

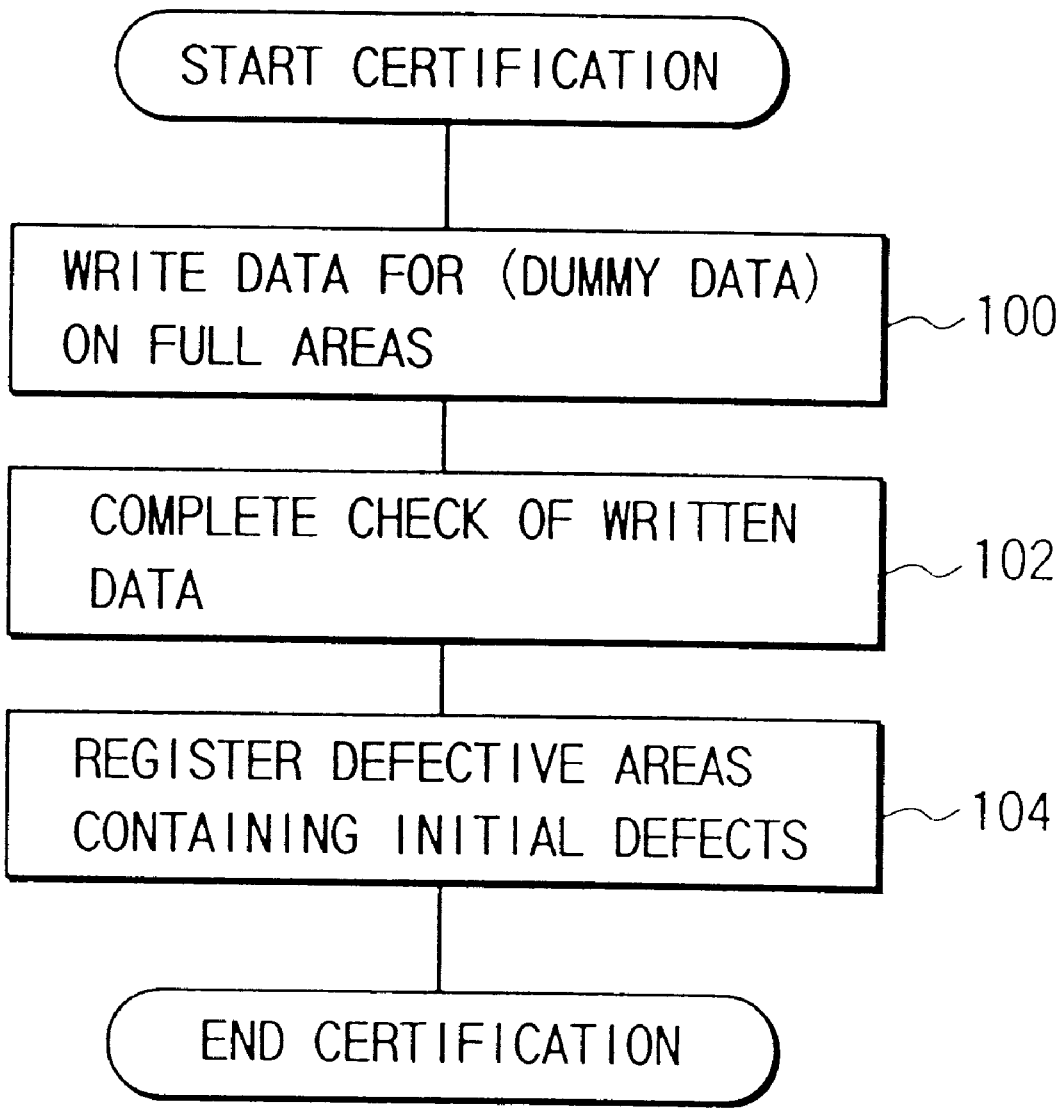
F I G. 26

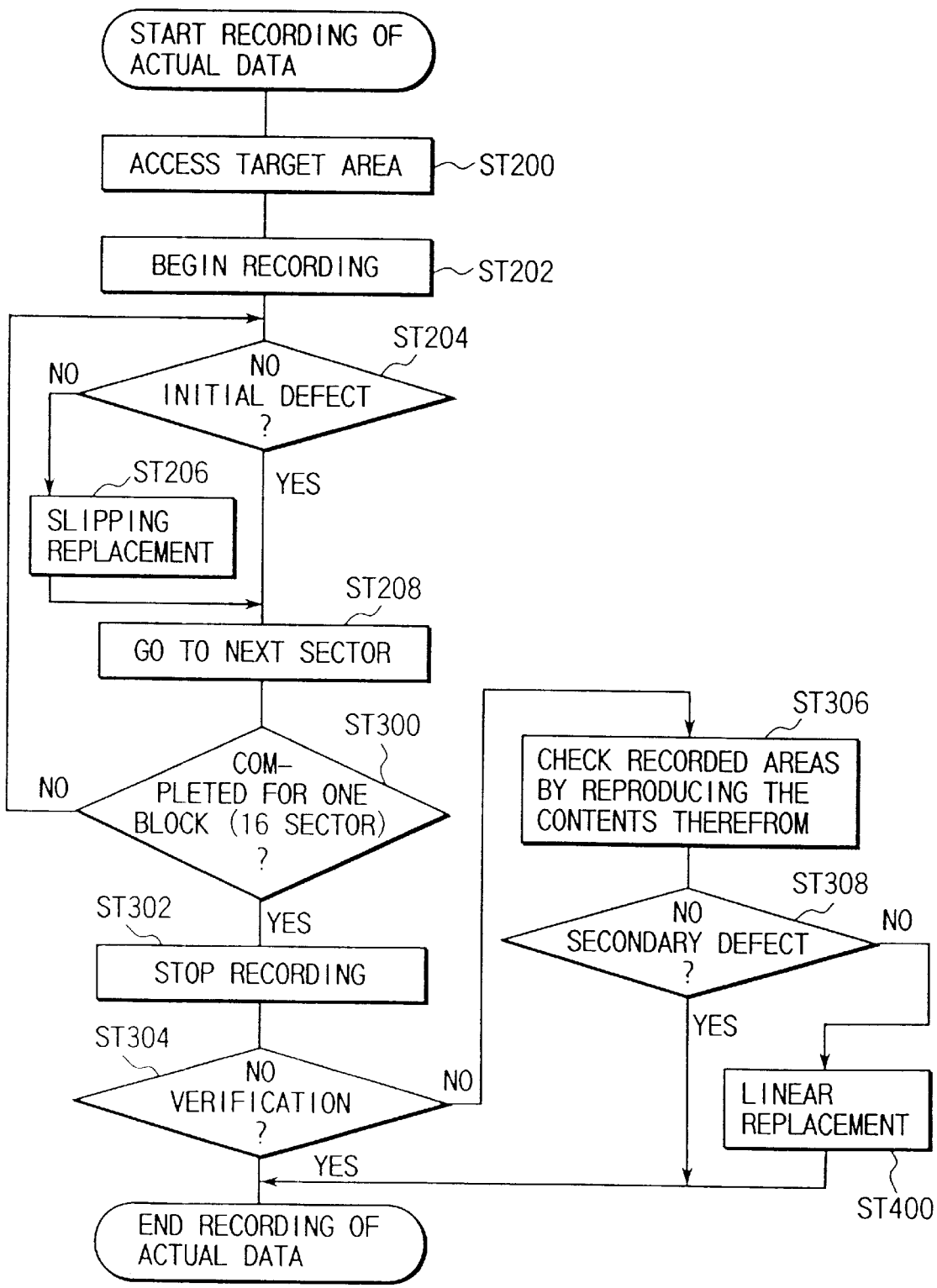
F I G. 27

INFORMATION RECORDING DISK HAVING REPLACEMENT AREA

This is a division of application Ser. No. 08/822,713, filed Mar. 24, 1997 abandoned.

BACKGROUND OF THE INVENTION

The present invention relates to an improvement of a RAM disk which performs replacement (exchange processing) upon detecting a defect in a recording block and records information by a zone CLV scheme (every time the recording track zone changes, the angular velocity changes; the angular velocity does not change in a zone).

In zone CLV (to be referred to as ZCLV hereinafter; CLV is the abbreviation of Constant Linear Velocity), the angular velocity is controlled to be constant in each zone (CAV; Constant Angular Velocity). When the recording track zone changes, the rotation speed (angular velocity) changes so that the average recording density in each zone becomes almost constant. That is, in ZCLV, CAV control is performed in each zone, and when the zone changes, the angular velocity changes accordingly.

In zone CAV (ZCAV) or modified CAV (MCAV), CAV control is performed in all zones, and when the zone changes, the read/write modulation rate changes.

For a ZCLV disk, the rotation servo of the disk need not be switched in each zone because the angular velocity does not change in each zone so that access properties similar to those of a CAV disk can be obtained in each zone. In ZCLV, when the zone changes, the angular velocity is changed (reduced in the outer zone of the disk). With this operation, a decrease in recording density on the outer side of the disk is prevented by maintaining a roughly constant average linear velocity on both inner and outer sides of the disk. Therefore, in the ZCLV disk, a memory capacity similar to that of a CLV disk and access properties similar to those of a CAV disk can be obtained.

In all writable disks of the CLV, CAV, and ZCLV schema, when a write error is generated in recording information, a dedicated replacement area is used to perform replacement (processing of writing data not in the data block where the error is generated but in a replacement area). In the CAV disk (e.g., a hard disk), the disk rotation speed is always constant. The rotation servo of the disk need not be switched in replacement (the rotation speed of a spindle motor need not be changed), and replacement is smoothly performed.

In the ZCLV disk, however, if the replacement area ranges over different rotation zones, the rotation speed of the spindle motor must be changed (because the disk is not a CAV disk). For this reason, the access speed decreases (since the rotation servo is switched every time the rotation zone changes, the time lag until the servo is seztled to a target rotation value is generated ever time the zone changes).

BRIEF SUMMARY OF THE INVENTION

It is an object of the present invention to increase the speed of replacement for error generation in an information recording/reproducing medium (e.g., a RAM disk) of a ZCLV scheme and provide a replacement method for this medium.

In order to achieve the above object, according to the present invention, a replacement area is formed for each constant rotation speed zone (in each constant angular velocity zone).

Three methods are available to arrange the replacement areas in units of constant angular velocity zones:

(1) The replacement area is arranged in the constant angular velocity zone on the inner side of the disk.

(2) The replacement area is arranged in the constant angular velocity zone on the outer side of the disk.

(3) The replacement area is arranged in the constant angular velocity zone at an optional position.

According to (1), an information recording disk. which is rotated at one of a plurality of rotation speeds to record information, comprises:

a first data area formed spirally or concentrcally with a center of rotation of the disk, in which information is recorded when the disk is being rotted at a first rotation speed;

a first replacement area formed spirally or concentrically with the center of rotation of the disk on a side closer to the center of rotation of the disk than the first data area, in which, upon detecting a write error in the first data area during rotation of the disk at the first rotation speed, write information associated with the write error is recorded at the first rotation speed in the second replacement area instead of in the first data area;

a second data area formed spirally or concentrically with the center of rotation of the disk, in which information is recorded when the disk is being rotated at a second rotation speed; and a second replacement area formed spirally or concentrically with the center of rotation of the disk on a side closer to the center of rotation of the disk than the second data area, in which, upon detecting a write error in the second data area during rotation of the disk at the second rotation speed, write information associated with the write error is recorded at the second rotation speed in the second replacement area instead of in the second data area.

According to the present invention, there is also provided a method of replacing write error information when information is to be recorded in the information recording disk, comprising the steps of:

performing replacement only in the first replacement area for a write error generated in the first data area; and performing replacement only in the second replacement area for a write error generated in the second data area.

According to (2), an information recording disk which is rotated at one of a plurality of rotation speeds to record information, comprises:

a first data area formed spirally or concentrically with a center of rotation of the disk, in which information is recorded when the disk is being rotated at a first rotation speed;

a first replacement area formed spirally or concentrically with the center of rotation of the disk on a side farther from the center of rotation of the disk than the first data area, in which, upon detecting a write error in the first data area during rotation of the disk at the first rotation speed, write information associated with the write error is recorded at the first rotation speed in the replacement area instead of in the first data area;

a second data area formed spirally or concentrically with the center of rotation of the disk, in which information is recorded when the disk is being rotated at a second rotation speed; and a second replacement area formed spirally or concentrically with the center of rotation of the disk on a side farther from the center of rotation of the disk than the second data area, in which, upon detecting a write error in the second data area during rotation of the disk at the second rotation speed, write information associated with the write error is recorded at the second rotation speed in the second replacement area instead of in the second data area.

According to the present invention, there is also provided a method of replacing write error information when information is to be recorded in the information recording disk, comprising the steps of:

performing replacement only in the first replacement area for a write error generated in the first data area; and performing replacement only in the second replacement area for a write error generated in the second data area.

According to (3), an information recording disk which is rotated at one of a plurality of rotation speeds to record information, comprises:

a first data area formed spirally or concentrically with a center of rotation of the disk, in which information is recorded when the disk is being rotated at a first rotation speed;

a first replacement area formed spirally or concentrically with the center of rotation of the disk in the first data area, in which, upon detecting a write error in the first data area during rotation of the disk at the first rotation speed, write information associated with the write error is recorded at the first rotation speed in the first replacement area instead of in the first data area;

a second data area formed spirally or concentrically with the center of rotation of the disk, in which information is recorded when the disk is being rotated at a second rotation speed; and a second replacement area formed spirally or concentrically with the center of rotation of the disk in the second data area, in which, upon detecting a write error in the second data area during rotation of the disk at the second rotation speed, write information associated with the write error is recorded at the second rotation speed in the second replacement area instead of in the second data area According to the present invention, there is also provided a method of replacing write error information when information is to be recorded in the information recording disk, comprising the steps of:

performing replacement only in the first replacement area for a write error generated in the first data area; and performing replacement only in the second replacement area for a write error generated in the second data area.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view for explaining data track arrangement 2 (a replacement area is arranged outside each data area) of the double-layered optical disk shown in FIG. 4;

FIG. 7 is a view for explaining data track arrangement 3 (a replacement area is arranged at the intermediate position of each data area) of the double-layered optical disk shown in FIG. 4;

FIG. 8 is a table for explaining the arrangement of data areas (DA1 to DA4) and replacement areas (RA1 to RA4) in units of track groups (#001 to #100; #101 to #200; #201 to #300; 301 to #400) with disk rotation speeds (N1 to N4) in an optical disk having the data track arrangement shown in FIG. 5 or 6;

FIG. 9 is a flow chart for explaining replacement performed in the optical disk having the arrangement shown in FIG. 5 or 6 when a write error is detected;

FIG. 10 is a block diagram showing the arrangement of an information recording/reproducing apparatus (optical RAM disk apparatus) according to an embodiment of the present invention;

FIG. 15 is a view showing the structure of the sector shown in FIG. 14;

FIG. 16 is a view showing the structure of the header shown in FIG. 14;

FIG. 17 is a view showing the structure of an ID number shown in FIG. 14;

FIG. 19 is a view for explaining slipping replacement in units of sectors;

FIG. 26 is a flow chart for explaining certification; and

FIG. 27 is a flow chart for explaining an actual data recording operation.

DETAILED DESCRIPTION OF THE INVENTION

Figure 1:
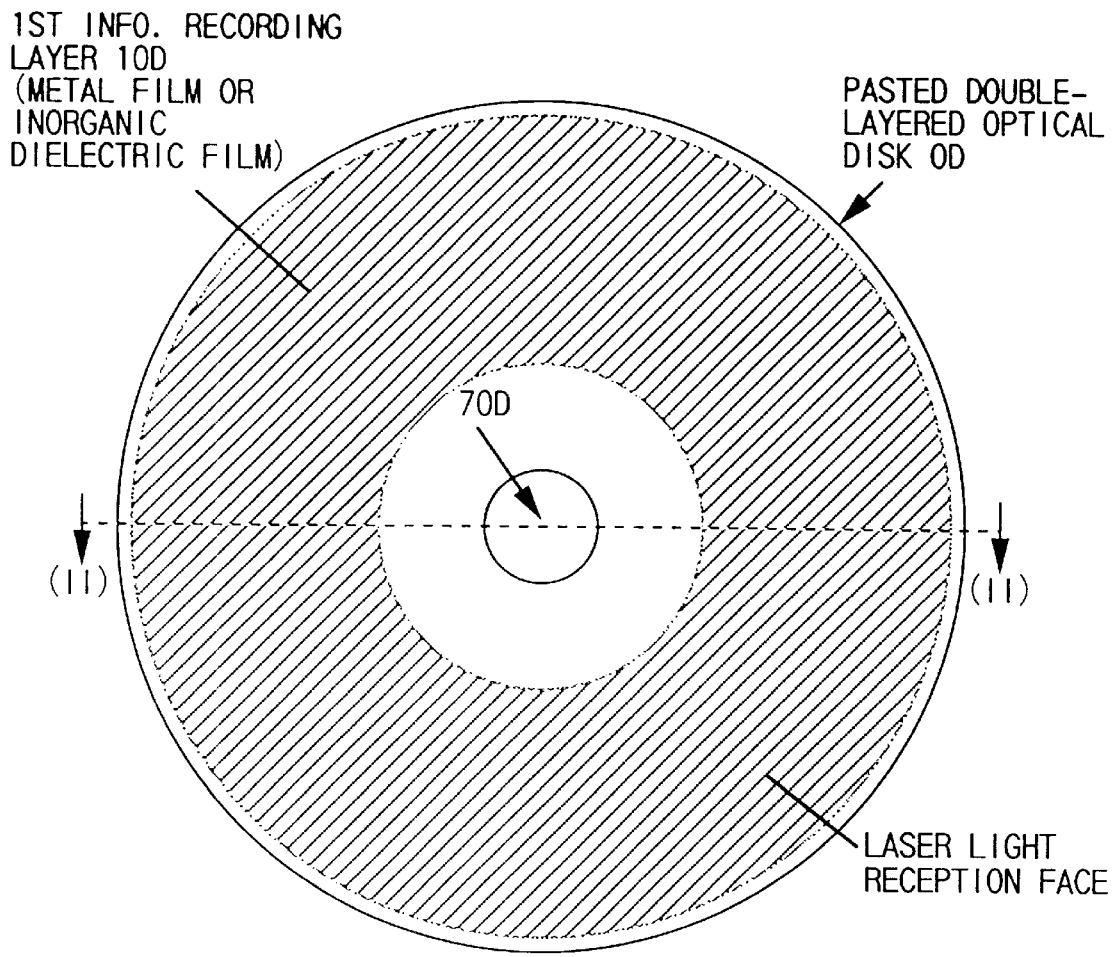
FIG. 1 is a plan view of a pasted double-layered optical disk according to an embodiment of the present invention when viewed from a laser light reception face side.

An information recording disk according to an embodiment of the present invention and a replacement method using this disk will be described below with reference to the accompanying drawing. The same reference numerals denote the same parts throughout the drawing, and a detailed description thereof will be omitted.

FIGS. 1 to 8 are views for explaining the information recording disk according to an embodiment of the present invention. FIG. 9 is a view for explaining the replacement method for the information recording disk according to an embodiment of the present invention.

FIG. 1 is a plan view showing a double-layered optical disk OD used as an example of the a pasted double-layered information recording medium of the present invention when viewed from a read laser reception face side. Optical disk OD has an outer diameter of 120 mm and central hole 70D with an inner diameter of 15 mm. Optical disk OD has a thickness of 1.2 mm corresponding to two 0.6 mm thick substrates which are pasted. Each of the pasted substrates has a doughnut-shaped information recording layer (data areas and replacement areas to be described later) (FIG. 1 shows only first information recording layer 10D on one substrate). The inner diameter of the doughnut-shaped information recording layer is about 45 mm, and the outer diameter is about 117 mm at maximum.

Figure 2:
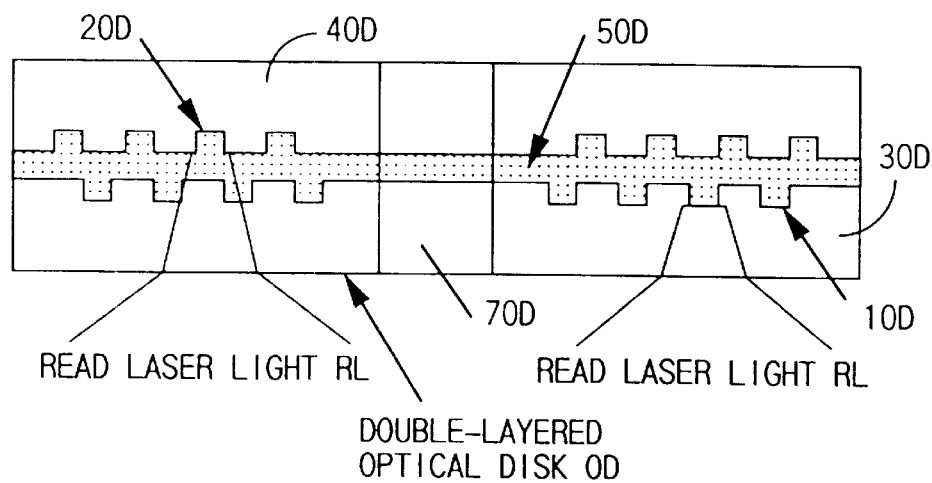
FIG. 2 is a view illustrating part of a section taken along a line (II)—(II) in FIG. 1.

FIG. 2 illustrates an enlarged view of part of the section of double-layered optical disk OD shown in FIG. 1 taken along a line (II)—(II). As shown in FIG. 2, disk OD comprises polycarbonate substrate 30D (thickness: about 0.6 mm) for holding the first information recording layer, first information recording layer 10D (semi-transparent film having a thickness of about 10 to 1,000 nm in which first information (upper face information of disk OD) formed by embossed pits is recorded, adhesive layer 50D (e.g., a UV curing resin) transparent to laser light RL, second information recording layer 20D (light-reflection film having a thickness of about 100 nm) in which second information (lower face information of optical disk OD) formed by embossed pits is recorded, and polycarbonate substrate 40D for holding the second information, viewed from a face on which read laser light RL (e.g., a semiconductor laser beam having a wavelength of 650 nm) is incident.

A label on which information (visual pattern information including characters, pictures, and patterns) associated with the recording information (the above-described first information and second information) is printed is bonded onto substrate face 40D on the opposite side of light reception face 30D of read laser light RL, as needed.

Figure 3:
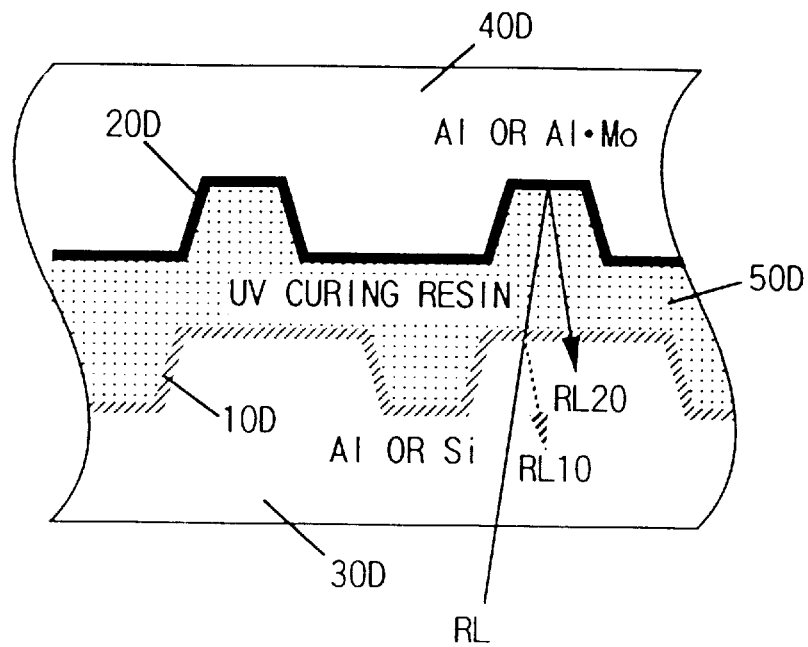
FIG. 3 is a partial sectional view illustrating the data recording portion (data is recorded by zone CAV or modified CAV) of the double-layered optical disk (read only) shown in FIG. 1.

FIG. 3 is a partial sectional view illustrating the data recording portion (embossed pits) of the double-layered optical disk (read only) shown in FIG. 1. A very thin metal film (thickness: about 10 to 20 nm) or a silicon (Si) thin film (thickness: about 10 to 1,000 nm) having a refractive index n of about 4 is used as first information recording layer 10D. Information recording layer 10D may be formed of another semi-transparent metal film or another semi-transparent inorganic dielectric film having a refractive index higher than that of polycarbonate substrate 30D, i.e., 1.6.

The reason why the refractive index of information recording layer (semi-transparent inorganic dielectric film) 10D is made higher than that of substrate 30D is that laser light RL focused and incident in layer 10D need be reflected by an interface (a plane at which the refractive index abruptly changes) between layer 10D and substrate 30D (if the refractive index of layer 10D is equal to that of substrate 30D, layer 10D and substrate 30D are formed of an optically uniform material with respect to laser light RL, so reflection of laser light does not occur at the interface between layer 10D and substrate 30D. Reflected light RL10 from layer 10D is almost eliminated, so the first information recorded in layer 10D cannot be read).

When information recording layer 10D is a metal film such as a gold film, the refractive index need not be taken into consideration, although thickness management for the layer is important (if layer 10D is too thick, light reflected by second information recording layer 20D is largely shielded by layer 10D, lowering the read C/N ratio of layer 20D; if layer 10D is too thin, light reflected by information recording layer 10D is weakened, lowering the read C/N ratio).

Figure 4:
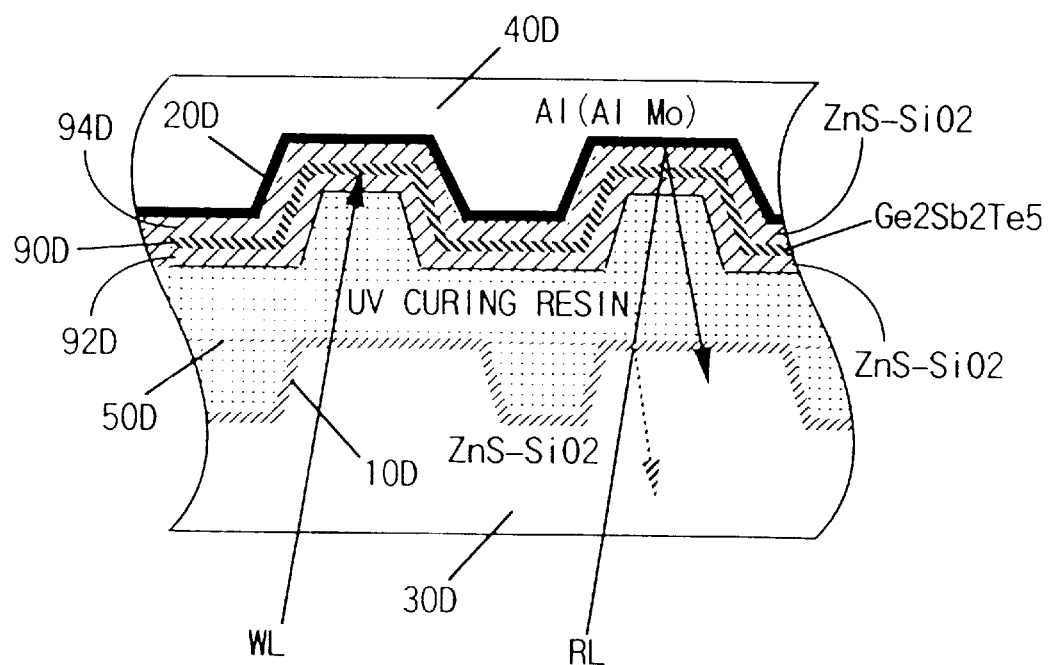
FIG. 4 is a partial sectional view illustrating the data recording portion (data is recorded by zone CAV or modified CAV) of the double-layered optical disk (phase change read/write) shown in FIG. 1.

FIG. 4 is a partial sectional view illustrating the data recording portion of read/write pasted double-layered optical disk OD in FIG. 1. Information recording layer 10D having a thickness of, e.g., 20 nm is formed of, instead of silicon shown in FIG. 3, a mixture ($ZnS/SiO_2$) of zinc sulfide (ZnS) and silicon oxide ($SiO_2$).

In addition, a triple layer (90D to 94D) consisting of two $ZnS/SiO_2$ mixture layers (92D and 94D) with phase change recording material layer 90D ($Ge_2Sb_2Te_5$) sandwiched therebetween is formed between reflection layer 20D using aluminum (Al) or aluminum-molybdenum alloy (Al-Mo) and UV curing resin adhesive layer 50D. The thickness of aluminum reflection film 20D is selected to be, e.g., about 100 nm. The thickness of $ZnS/SiO_2$ mixture layer 94D is selected to be, e.g., about 20 nm. The thickness of $Ge_2Sb_2Te_5$ phase change recording material layer 90D is selected to be, e.g., about 20 nm. The thickness of $ZnS/SiO_2$ mixture layer 92D is selected to be, about 180 nm.

The read only information is recorded as an embossed pit signal in substrate 30D. However, no embossed pit signal is recorded in substrate 40D of the read/write disk. Instead, a continuous groove is formed in substrate 40D. Phase change recording material layer 90D is formed in this groove.

A data area to be described later, is formed on lacer 10D or 20D shown in FIG. 3 or on layer 10D or 90D shown in FIG. 4. A replacement area to be described lazer is formed on laver 90D shown in FIG. 4.

Since no replacement areas in which data is written later can be arranged in the read only optical disk shown in FIG. 3, the present invention cannot be practiced with only the structure shown in FIG. 3. However, the present invention can be applied to an optical disk which has both the structures shown in FIGS. 3 and 4 (e.g., an optical disk having the structure in FIG. 3 at part of the inner side and the structure in FIG. 4 at part of the outer side).

Figure 5:
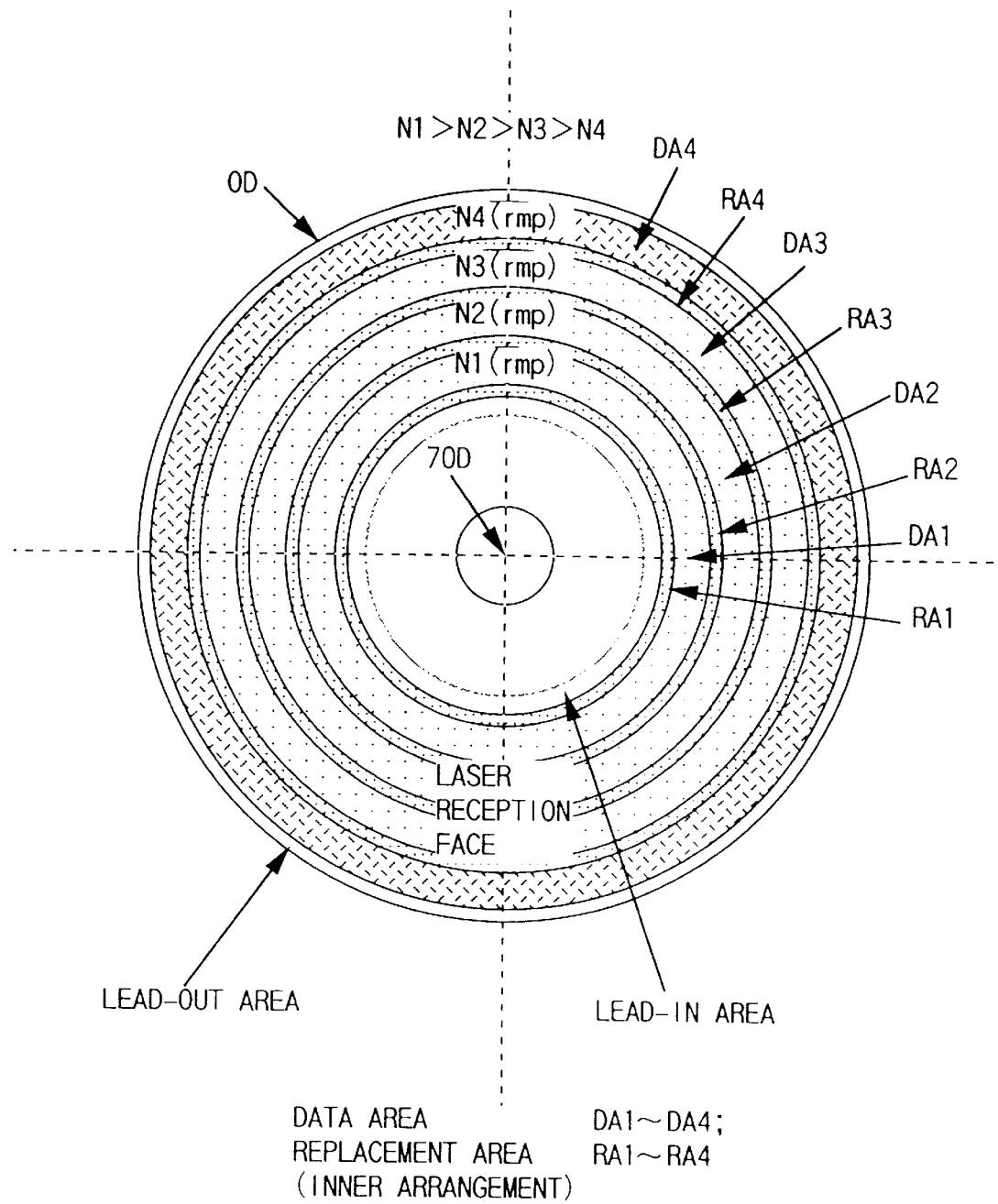
FIG. 5 is a view for explaining data track arrangement 1 (a replacement area is arranged inside each data area) of the double-layered optical disk shown in FIG. 4.

FIG. 5 is a view for explaining data track arrangement 1 (a replacement area is arranged inside each data area) of the double-layered optical disk shown in FIG. 4.

In this arrangement, replacement area RA1 whose rotation speed (rpm) is N1 is arranged spirally or concentrically with data area DA1 whose rotation speed is N1. Replacement area RA1 can be arranged at any portion in the zone where the rotation speed is equal to that of the data area DA1. In this case, replacement area RA1 is arranged on the inner side of disk OD.

Similarly, data area DA2 with rotation speed N2 is arranged outside data area DA1, and replacement area RA2 with rotation speed N2 is arranged spirally or concentrically with data area DA2. Data area DA3 with rotajion speed N3 is arranged outside data area DA2, and replaczment area RA3 with rotation speed N3 is arranged spirally or concentricaily with data area DA3. Data area DA4 with rotation speed N4 is arranged outside data area DA3, and replacement area RA4 with rotation speed N4 is arranged spirally or concentrically with data area DA4.

In this data area arrangement, the relation between the rotation speeds of the constant rotation zones is defined as N1>N2>N3>N4 to average the recording densities of the rotation zones (DA1+RA1; DA2+RA2; DA3+RA3; DA4+RA4), thereby ensuring a large recording capacity in the entire disk.

The number of data areas or replacement areas (the number of zones with constant rotation speeds) is set to four for descriptive convenience. However, the number of areas (the number of zones) may be larger in an actual disk, or the present invention can be practiced even with three or less zones.

When a write error is generated in data area DA1 of optical disk OD having the structure shown in FIG. 5, replacement is performed only in replacement area RA1 of the same rotation speed zone. Similarly, replacement of a write error generated in data area DA2 is performed only in replacement area RA2 of the same rotation speed zone. Replacement of a write error generated in data area DA3 is performed only in replacement area RA3 of the same rotation speed zone. Replacement of a write error generated in data area DA4 is performed only in replacement area RA4 of the same rotation speed zone.

With this arrangement, the rotation speed of disk OD need not be switched during replacement. Therefore, replacement can be performed at a higher speed.

FIG. 6 is a view for explaining data track arrangement 2 (a replacement area is arranged outside each data area) of the double-layered optical disk shown in FIG. 4.

In this arrangement as well, replacement area RA1 whose rotation speed (rpm) is N1 is arranged spirally or concentrically with data area DA1 whose rotation speed is N1. In this case, replacement area RA1 is arranged on the outer side of the same rotation speed zone.

More specifically, replacement area RA1 with rotation speed N1 is arranged, outside data area DA1 with rotation speed N1, spirally or concentrically with data area DA1. Data area DA2 wish rotation speed N2 and replacement area RA2 with rotation speed N2, arranged spirally or concentrically with data area DA2, are formed outside replacement area RA1 . Data area DA3 with rotation speed N3 and replacement area RA3 witnh rotation speed N3, arranged spirally or concentrically with data area DA3, are formed outside replacement area RA2. Data area DA4 with rotatico speed N4 and replacement area RA4 with rlotation speed N4, arranged spirally or concentrically with data area DA4, are formed outside replacement area RA3.

In this data area arrangement as well, the relation between the rotation speeds of the constant rotation zones is defined as N1>N2>N3>N4 to average the recording densities of the rotation zones (DA1+RA1; DA2+RA2; DA3+RA3; DA4+RA4), thereby ensuring a large recording capacity in the entire disk.

The number of data areas or replacement areas (the number of zones with constant rotation speeds) is set to four for descriptive convenience. However, the number of areas (the number of zones) may be larger, or the present invention can be practiced even with three or less zones.

When a write error is generated in data area DA1 of optical disk OD having the structure shown in FIG. 6, replacement is performed only in replacement area RA1 of the same rotation speed zone. Similarly, replacement of a write error generated in data area DA2 is performed only in replacement area RA2 of the same rotation speed zone. Replacement of a write error generated in data area DA3 is performed only in replacement area RA3 of the same rotation speed zone. Replacement of a write error generated in data area DA4 is performed only in replacement area RA4 of the same rotation speed zone.

With this arrangement, the rotation speed of disk OD need not be switched during replacement. Therefore, replacement can be performed at a higher speed.

FIG. 7 is a view for explaining data track arrangement 3 (a replacement area is arranged at an intermediate position of each data area) of the double-layered optical disk shown in FIG. 4.

In this arrangement as well, replacement area RA1 whose rotation speed (rpm) is N1 is arranged spirally or concentrically with data area DA1 whose rotation speed is N1. In this case, replacement area RA1 is arranged at an intermediate position (optional position) of the same rotation speed zone.

More specifically, replacement area RA1 with rotation speed N1 is arranged, at an intermediate position of data area DA1 with rotation speed N1, spirally or concentrically with data area DA1. Data area DA2 with rotation speed N2 and replacement area RA2 with rotation speed N2, arranged spirally or concentrically with data area DA2, are formed outside data area DA1 on the outer side. Replacement area RA2 is arranged at an intermediate position of data area DA2.

In this data area arrangement as well, the relation between the rotation speeds of the constant rotation zones is defined as N1>N2 to average the recording densities of the rotation zones (DA1+RA1; DA2+RA2), thereby ensuring a large recording capacity in the entire disk.

The number of data areas or replacement areas (the number of zones with constant rotation speeds) is set to two for descriptive convenience. However, the number of areas (the number of zones) may be larger.

When a write error is generated in data area DA1 of optical disk OD having the structure shown in FIG. 7, replacement is performed only in replacement area RA1 of the same rotation speed zone. Similarly, replacement of a write error generated in data area DA2 is performed only in replacement area RA2 of the same rotation speed zone.

With this arrangement, the rotation speed of disk OD need not be switched during replacement. Therefore, replacement can be performed at a higher speed.

Optical disk OD having an area pattern shown in FIG. 6 or 7 has no replacement area RA1 between the lead-in area and first data area DA1. In this case, once a disk reproducing apparatus (not shown) reads various disk content information from the lead-in area, data area DA1 can be immediately reproduced (the optical pickup need not jump replacement area RA). This is the large difference to the area pattern shown in FIG. 5.

In the area pattern shown in FIG. 6, data areas DA1 and DA3 may have the read only structure in FIG. 3, and data areas DA2 and DA4 may have the read/write structure in FIG. 4. In this case, replacement areas RA1 and RA2 may be arranged in the rotation speed N2 zone and used for replacement of data area DA2, and replacement areas RA3 and RA4 may be arranged in the rotation speed N4 zone and used for replacement of data area DA4.

FIG. 8 is a view for explaining the arrangement of data areas (DA1 to DA4) and replacement areas (RA1 to RA4) in units of track groups with the disk rotation speeds (N1 to N4) in an optical disk having the data track arrangement shown in FIG. 5 or 6.

For the descriptive convenience, each constant rotation zone comprises 100 tracks (#001 to #100; #101 to #200; #201 to #300; #301 to #400).

When the area pattern shown in FIG. 5 is to be employed, an arrangement shown in record map (1) of FIG. 8 is employed. More specifically, tracks with smaller numbers (#001 and #002 in the rotation speed N1 zone; #101 and #102 in the rotation speed N2 zone; #201 and #202 in the rotation speed N3 zone; #301 and #302 in the rotation speed N4 zone) are assigned to the replacement areas (RA1; RA2; RA3; RA4). Tracks with larger numbers (#003 to #100 in the rotation speed N1 zone; #103 to #200 in the rotation speed N2 zone; #203 to #300 in the rotation speed N3 zone; #303 to #400 in the rotation speed N4 zone) are assigned to the data areas (DA1; DA2; DA3; DA4).

When the area pattern shown in FIG. 6 is to be employed, an arrangement shown in record map (2) of FIG. 8 is employed. More specifically, tracks with smaller numbers (#001 to #098 in the rotation speed N1 zone; #101 and #198 in the rotation speed N2 zone; #201 to #298 in the rotation speed N3 zone; #301 to #398 in the rotation speed N4 zone) are assigned to the data areas (DA1; DA2; DA3; DA4). Tracks with larger numbers (#099 and #100 in the rotation speed N1 zone; #199 and #200 in the rotation speed N2 zone; #299 and #300 in the rotation speed N3 zone; #399 and #400 in the rotation speed N4 zone) are assigned to the replacement areas (RA1; RA2; RA3; RA4).

When the area pattern shown in FIG. 7 is to be employed, although not illustrated, for example, tracks #001 to #100 and tracks #111 to #200 may be assigned to data area DA1, and tracks #101 to #110 may be assigned to replacement area RA1. Tracks #201 to #300 and tracks #311 to #400 may be assigned to data area DA2, and tracks #301 to #310 may be assigned to replacement area RA2.

FIG. 9 is a flow chart for explaining replacement performed when a write error is detected in an optical disk having the data track arrangement shown in FIG. 5 or 6 (The disk write apparatus can have a known arrangement and therefore is not illustrated. The processing of this flow chart can be executed by the system software or firmware of the disk write apparatus).

Assume that optical disk OD shown in FIG. 6 is loaded in the disk write apparatus (not shown), and the user instructs data write access in any one of the data blocks of data area DA1.

A data source (not shown) (e.g., a specific file on the hard disk) is fetched by the disk write apparatus in units of specific block units (e.g., in units of 2 kbytes) (step ST10). The fetched data is temporarily written in a buffer memory (not shown).

The fetched data is written in a data block (one of the blocks of data area DA1) which is designated by the firmware of the disk write apparatus (step ST12). The written data is read out immediately after the write access and compared with the data written in the buffer memory. It is checked whether the data is correctly written (step ST14).

If the written data coincides with the readout data, it is determined that there is no write error (NO in step ST16). Otherwise, a write error is detected (YES in step ST16).

When the detected error exceeds an allowable degree and is not negligible, and if retry writing has not been performed yet at (NO in step ST18), the data written in the buffer memory is written again in the error detection block (step ST20).

If, for the data which has undergone re-try writing (step ST20), a write error is detected again (YES in step ST16), the error detection block is determined as a defective block because the write access has already been retried (YES in step ST18) (this defective block is stored by the firmware or system software of the disk write apparatus and not used for write access anymore).

Upon determining the defective block, replacement is performed (step ST22). More specifically, the write data in the buffer memory for which retry has failed is written in a free block (known by the firmware or system software of the disk write apparatus) of replacement area RA1 with the same rotation speed as that, i.e., N1, of data area DA1 where the defective block is detected.

The above processing (steps ST10 to ST22) is executed for all data files to be written in disk OD. When write of all these data files is completed (YES step ST24), processing in FIG. 9 is ended.

The above description can be applied to any of data areas DA2 to DA4 and replacement areas RA2 to RA4 shown in FIG. 6.

The processing in FIG. 9 has been described for disk OD in FIG. 6, although it can also be applied to disk OD in FIG. 5 or 7.

FIG. 10 is a block diagram showing the arrangement of an information recording/reproducing apparatus (optical RAM disk recording/reproducing apparatus) according to an embodiment of the present invention.

This information recording/reproducing apparatus records data or reproduces recorded data in or from optical disk OD by using a laser beam.

Optical disk OD is rotated at a predetermined speed by spindle motor 3 whose rotation is controlled by motor controller 4.

Recording/reproduction of information in/from optical disk OD is performed by optical head 5. Optical head 5 is fixed to driving coil 7 which constitutes the movable portion of linear motor 6. Driving coil 7 is connected to linear motor controller 8.

A permanent magnet (not shown) is arranged at the stationary portion of linear motor 6. When driving coil 7 is excited by linear motor controller 8, optical head 5 is freely moved in the radial direction of optical disk OD by a magnetic attracting/repelling force generated between the permanent magnet and driving coil 7 in accordance with excitation.

Speed detector 9 is connected to linear motor controller 8 so that the moving speed signal of optical head 5 is fed back to linear motor controller 8. With feedback of the speed signal, the movement of optical head 5 in the radial direction is controlled.

Objective lens 10 supported by a wire or leaf spring (not shown) is arranged on the disk opposing face of optical head 5. Objective lens 10 can be vertically moved along the focusing direction (along the optical axis of the lens) by driving coil 11 and can also be horizontally (or in the front-and-rear direction) moved along the tracking direction (along a direction perpendicular to the optical axis of the lens) by driving coil 12.

A laser beam emitted from a semiconductor laser oscillator (or an argon-neon laser oscillator) driven by laser controller 13 is irradiated on optical disk OD through collimator lens 20, half prism 21, and objective lens 10. Light reflected by optical disk OD is guided to photodetector 24 through objective lens 10, half prism 21, condenser lens 22, and cylindrical lens 23.

Photodetector 24 is constituted by four photodetecting cells 24a to 24d.

An output signal from photodetecting cell 24a of photodetector 24 is supplied to one terminal of each of adders 26a and 26d through amplifier 25a. An output signal from photodetecting cell 24b is supplied to one terminal of each of adders 26b and 26c through amplifier 25b. An output signal from photodetecting cell 24c is supplied to the other terminal of each of adders 26a and 26c through amplifier 25c. An output signal from photodetecting cell 24d 1s supplied to the other terminal of each of adders 26a and 26d through amplifier 25d.

An output signal from adder 26a is supplied to the inverting input terminal of differential amplifier OP2. An output signal from adder 26b is supplied to the noninverting input terminal of differential amplifier OP2. Differential amplifier OP2 supplies a signal associated with a focus point to focusing controller 27 in accordance with the difference between the outputs from adders 26a and 26b. An output signal from focusing controller 27 is supplied to driving coil 11 so that control is performed to always bring the laser beam to an in-focus position on optical disk OD.

An output signal from adder 26d is supplied to the inverting input terminal of differential amplifier OP1. An output signal from adder 26c is supplied to the noninverting input terminal of differential amplifier OP1. Differential amplifier OP1 supplies a track difference signal to tracking controller 28 in accordance with the difference between the outputs from adders 26d and 26c. Tracking controller 28 generates a track driving signal in accordance with the track difference signal supplied from differential amplifier OP1.

The track driving signal output from tracking controller 28 is supplied to driving coil 12 in the tracking direction. The track difference signal used by tracking controller 28 is supplied to linear motor controller 8.

Once focusing control and tracking control are performed in the above manner, a change in reflectance from a pit (recorded data) formed on a track is reflected to the sum signal of outputs from photodetecting cells 24a to 24d of photodetector 24, i.e., an output signal from adder 26e. This signal is supplied to data reproduction circuit 18. Data reproduction circuit 18 outputs an access enable signal for an ECC block with an ID for recording or data reproduced from an ECC block with an ID for reproduction.

Data reproduced by data reproduction circuit 18 is output to error correction circuit 32 via bus 29. Error correction circuit 32 corrects an error with an error correction code (ECC) in the reproduced data or adds an error correction code to recorded data supplied from I/O 35 and outputs the recorded data to memory 34.

Error correction circuit 32 uses, e.g., a Reed-Solomon product code.

Reproduced data which has undergone error correction by error correction circuit 32 is output to optical disk apparatus 36 as an external apparatus for the apparatus shown in FIG. 10 through bus 29 and I/O 35. Optical disk apparatus 36 supplies recorded data to error correction circuit 32 through I/O 35 and bus 29.

When objective lens 10 is moving under the control of tracking controller 28, linear motor controller 8 controls linear motor 6 such that objective lens 10 is positioned near the central position in optical head 5.

Data generator 14 is connected to laser controller 13. Data generator 14 has ECC block data circuit 14a and modulation circuit 14b. ECC block data circuit 14a adds a sync code for an ECC block to the ECC block format data (FIG. 13) which is supplied from error correction circuit 32, thereby generating ECC block format data for recording. Modulation circuit 14b modulates recording data from ECC block data circuit 4a by using 8-15 code conversion.

Recorded data with an error correction code added by error correction circuit 32 is supplied to data generator 14. Recorded data from optical disk apparatus 36 is supplied to error correction circuit 32 through I/O 35 and bus 29.

Figure 13:
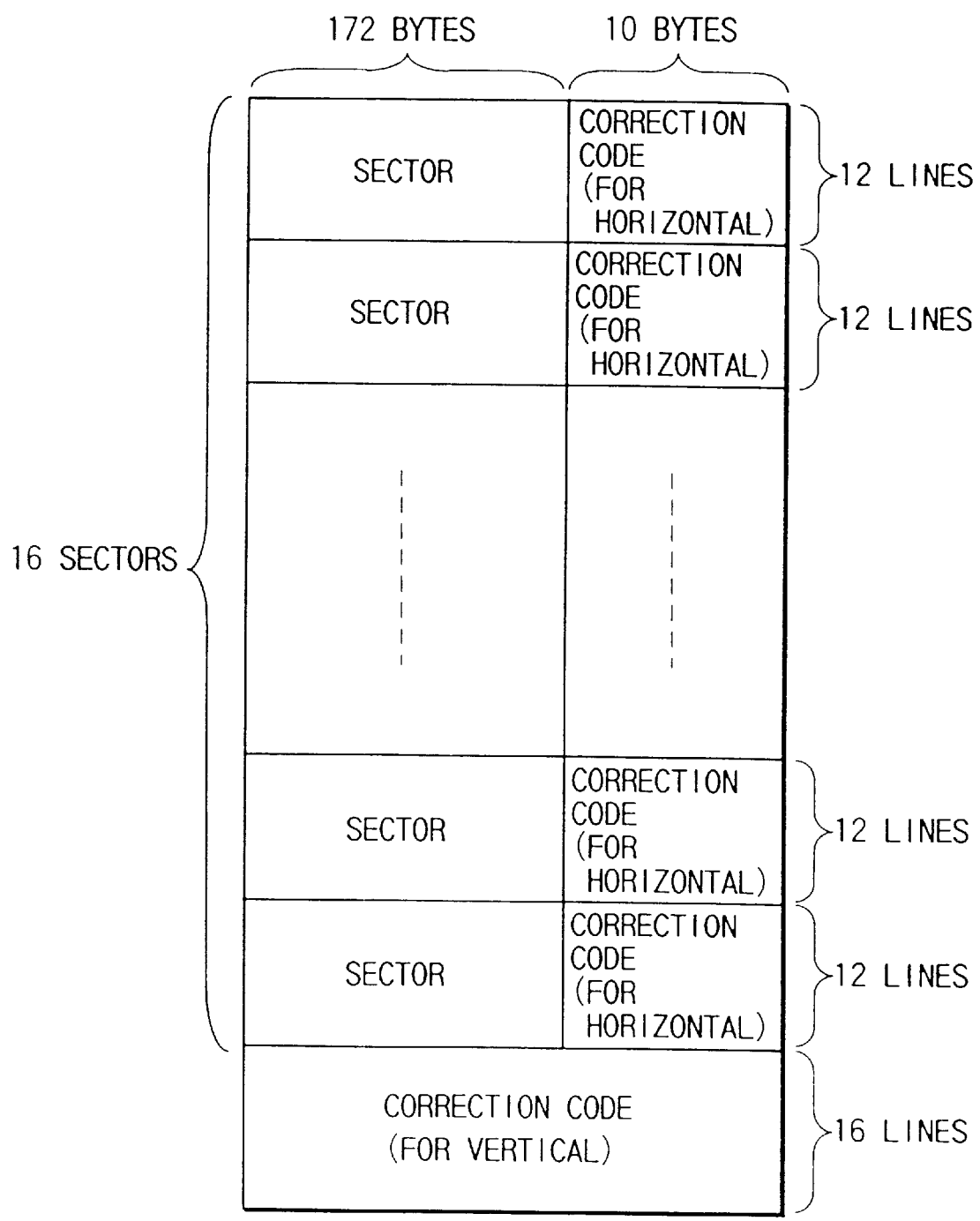
FIG. 13 is a view for explaining the format of an error correction code (ECC) block of the optical disk used in the apparatus shown in FIG. 10.

Error correction circuit 32 partitions recorded data, which is supplied from optical disk apparatus 36 in units of 32 kbytes (in units of ECC blocks), into recorded data in units of 16 sectors (in units of blocks). An error correction code is added to each of the partitioned ECC data along the horizontal bit array and vertical bit array. A sector ID number is added to the ECC data with an error correction code added, so that data with an ECC block format as shown in FIG. 13 is generated.

This optical disk apparatus has DAC 31 perform transmission/reception of digital information between focusing controller 27, tracking controller 28, and linear motor controller 8, and CPU 30 for controlling the entire operation of the optical disk apparatus.

Motor controller 4, linear motor controller 8, laser controller 13, data reproduction circuit 18, focusing controller 27, tracking controller 28, and error correction circuit 32 are digitally controlled by CPU 30 via bus 29. CPU 30 instructs various operations of the apparatus which include this digital control on the basis of a program stored in memory 33.

Assuming a RAM (Random Access Memory) type DVD (Digital Video Disk) (DVDRAM) which can write/read information, the arrangement of optical disk OD used in the apparatus shown in FIG. 10 will be described.

Optical disk OD is formed by coating the face of a circular substrate of glass or plastic with a doughnut-shaped metal film of tellurium or bismuth (FIG. 4).

Figure 11:
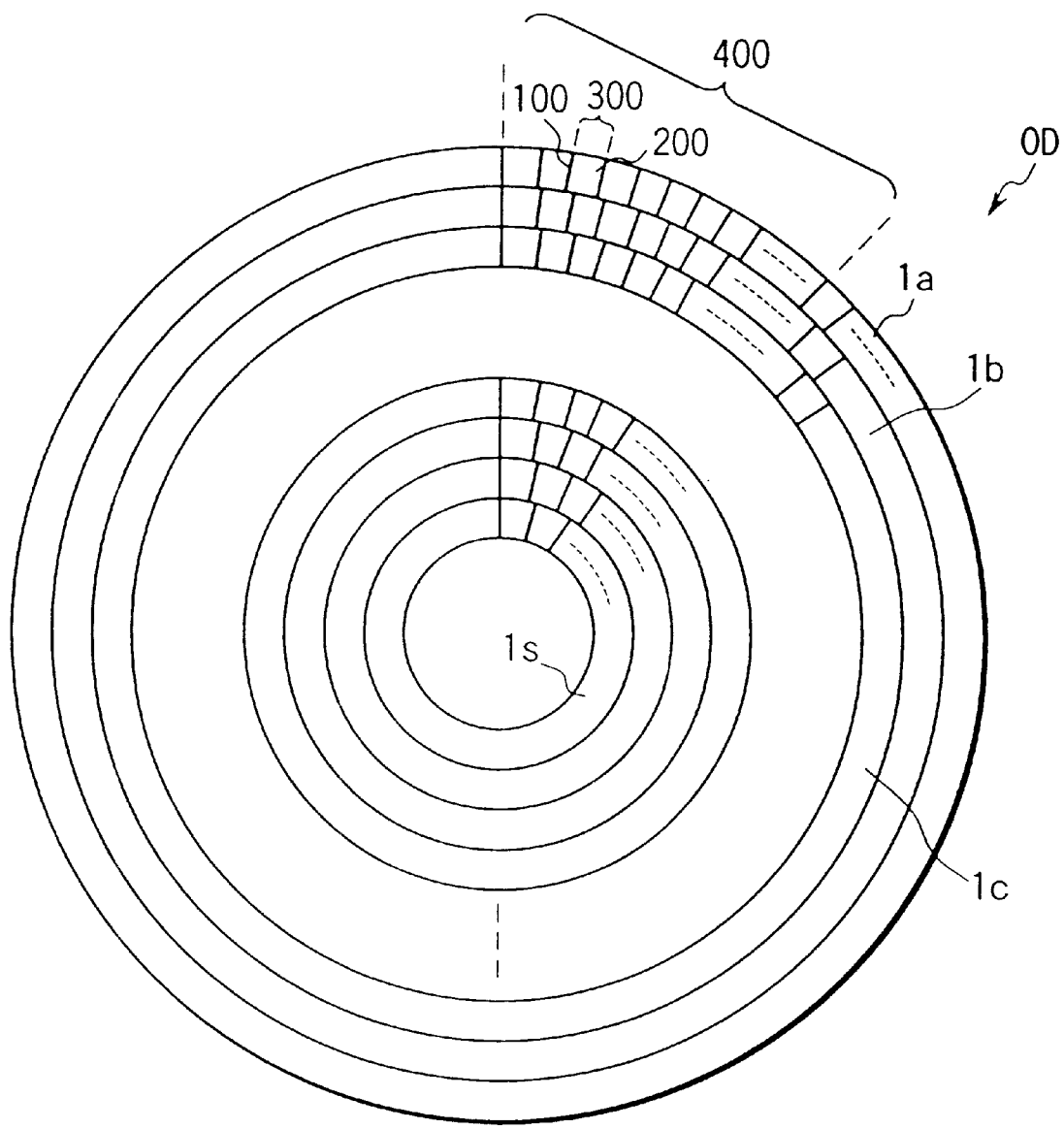
FIG. 11 is a view for explaining the physical format of an optical disk used in the apparatus shown in FIG. 10.

As shown in FIG. 11, the information recording portion of optical disk OD is divided into a plurality of zones (19 zones 1a to is in this case) each of which consists of a lot of tracks arranged concentrically in the radial direction of optical disk OD. Clock signals (clocks for determining information write rates) for zones 1a to is have different frequency values ,the frequency is raised from the inner to the outer circumference).

Each of zones 1a to is has a plurality of continuous sectors 300 each of which comprises header portion (address area) 100 in which address data representing a data recording position is recorded and data portion 200 in which the data is recorded. Header portion 100 is an area having a predetermined track length where address data representing a data recording position on each track is preformatted. The number of sectors 300 in each track decreases toward the inner diameter of optical disk OD.

A plurality of ECC blocks 400 each including an error correction code recording area, where error correction codes (ECCs) are recorded at once, are formed on optical disk OD.

Error correction code ECC is constituted by a set of a predetermined number of sectors 300 of the plurality of sectors 300. Error correction code ECC is used to correct an error which can be generated in reproduction of data recorded in sector 300.

The information recording portion of optical disk OD having the above track/sector arrangement can have a structure shown in FIG. 4. Replacement areas for defective sectors (or defective data blocks) can be arranged as shown in FIGS. 5 to 7.

FIG. 11 shows a format assuming concentrically arranged tracks. However, the tracks may be arranged spirally.

The logical format structure of optical disk OD will be described below with reference to FIG. 12.

Figure 12:
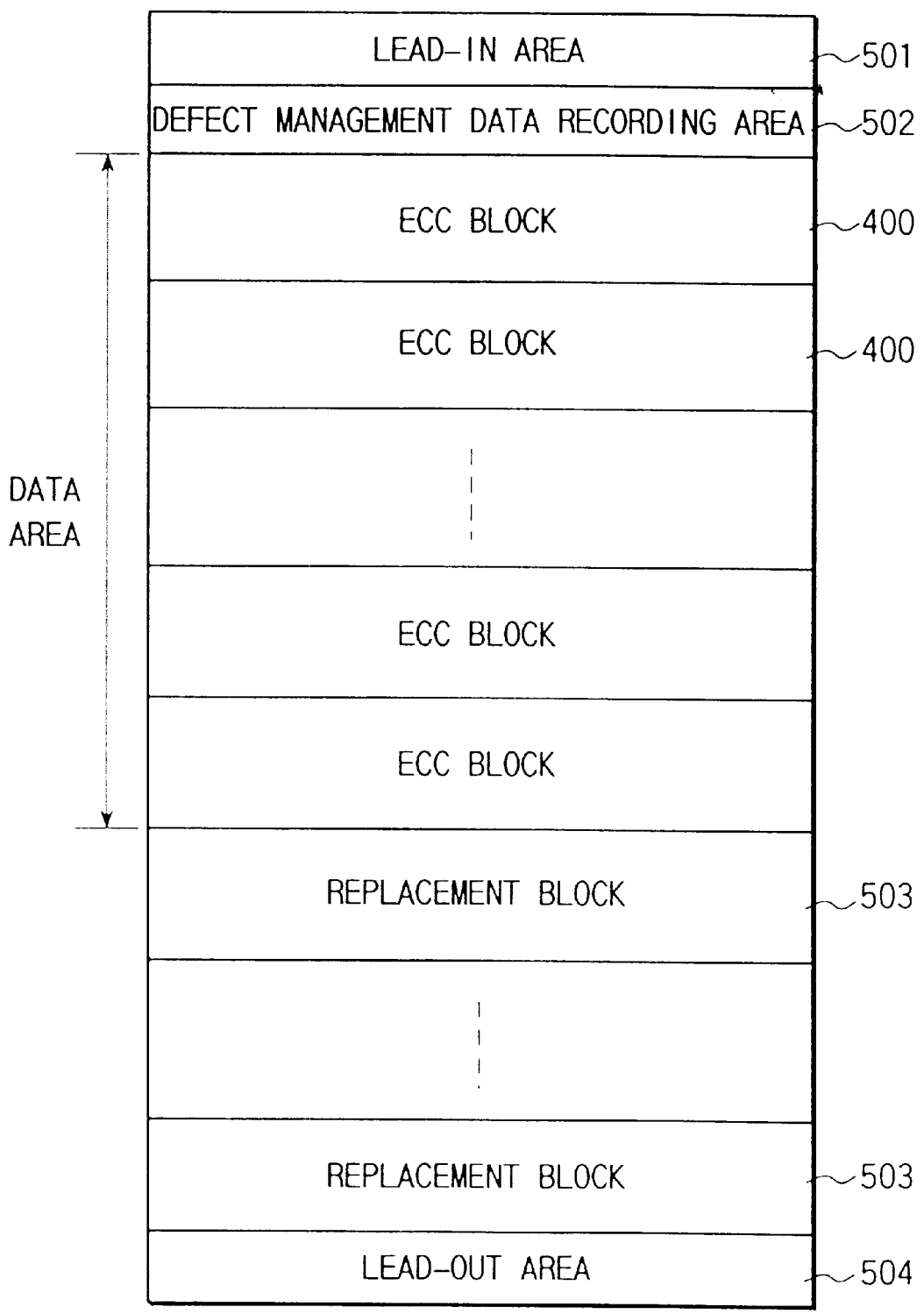
FIG. 12 is a view for explaining the logical format of the optical disk used in the apparatus shown in FIG. 10.

The data recording area from lead-in area 501 to lead-out area 504 of optical disk OD has a structure as shown in FIG. 12. More specifically, the data recording area from lead-in area 501 to lead-out area 504 contains defect management data recording area 502, the plurality of ECC blocks 400, and a plurality of replacement blocks 503.

Defect management data representing that a sector area determined as defective or an ECC block area determined as defective is replaced is recorded in defect management data recording area 502. Recording of defective management data will be described later in detail. A predetermined number of blocks of the plurality of ECC blocks 400 are assigned to replacement block 503. [Structure of Data Area and Buffer Blocks in Data Area]

ECC block 400 in FIG. 12 can be interpreted as a data area containing a rewritable data zone. The data area is interrupted by buffer blocks at each zone boundary. The buffer blocks are constituted by some blocks at the beginning of each zone and some blocks at the end of each zone. The buffer blocks contain embossed grooves and header fields and are not used for user data.

[Defect Management Area]

Defect management data recording area 502 shown in FIG. 12 may be constituted by four defect management areas (DMA1 to DMA4). These defect management areas contain information on the structure of the data area and on the defect management. Each defect management area (DMA1 to DMA4) is constituted by 32 sectors. Two defect management areas (DMA1 and DMA2) are located near the inner diameter of optical disk OD. Two other areas (DMA3 and DMA4) are located near the outer diameter of optical disk OD (RA1 to RA4 in FIG. 5 or 6). Each defect management area (DMA1 to DMA4) is followed by two blocks of reserved sectors.

Each defect management area (DMA1 to DMA4) consists of two ECC blocks followed by two reserved sectors. A disk definition structure (DDS) of disk OD and a primary defect list (PDL) are contained in the first ECC block of each defect management area (DMA1 to DMA4). A secondary defect list (SDL) is contained in the second ECC block of each defect management area (DMA1 to DMA4). The contents of the four primary defect lists (PDLs) of the four defect management areas (DMA1 to DMA4) are identical, and the contents of the four secondary defect lists (SDLs) are also identical.

The contents of the four disk definition structures (DDSs) of the four defect management areas (DMA1 to DMA4) are basically identical. However, the pointers for the PDLs and SDLs of the four defect management areas have different contents.

A DDS/PDL block means an ECC block containing a DDS and a PDL. An SDL block means an ECC block containing an SDL.

After initialization of optical disk OD, each defect management area (DMA) has the following content:

(1) The first sector of each DDS/PDL block contains a DDS.

(2) The second sector of each DDS/PDL block contains a PDL.

(3) The first sector of each SDL block contains an SDL.

The block lengths of the PDL and the SDL are determined by the number of entries. Unused sectors in each defect management area are filled with 0FFh. All reserved sectors are filled with 00h.

[Disk Definition Structure]

The DDS consists of a table with a length of one sector. The DDS has contents for specifying the method of initialization of disk OD and the start addresses of the PDL and SDL. The DDS is recorded in the first sector of each defect management area (DMA) upon completion of initialization of disk OD.

[Partitioning]

During initialization of disk OD, the data area is partitioned into 24 continuous groups. Each group spans one complete zone excluding the buffer blocks.

The plurality of buffer blocks are allocated at the beginning of each zone except the beginning of zone 0 and the ending of zone 23.

Each group comprises full blocks of data sectors followed by full blocks of spare sectors.

[Spare Sector]

Defective sectors in each data area are replaced (exchanged) by good sectors according to the defect management method of the present invention (certification, slipping replacement, or linear replacement to be described later). The number of spare blocks for replacement is a predetermined number, e.g., 4,087 or less.

Optical disk OD is initialized before use. This initialization can be executed with or without certification.

Defective sectors are handled by a slipping replacement algorithm or by a linear replacement algorithm. The total number of entries listed in the PDL and the SDL by both algorithms is a predetermined number, e.g., 4,092 or less.

[Initialization]

During initialization of disk OD, the four defect management areas (DMA1 to DMA4) are recorded prior to the first use of the disk. The data area is partitioned into 24 groups. Each group contains a number of blocks for data sectors followed by a number of spare blocks. The spare blocks can be used for replacement of defective sectors. Initialization can include certification (verification) of the groups. With this processing, defective sectors which have been detected in initialization are specified and skipped in use.

All DDS parameters are recorded in the four DDS sectors. The PDL and SDL are recorded in the four defect management areas (DMA1 to DMA4). In the first initialization, an update counter in the SDL is set to 00h. All reserved blocks are filled with 00h.

[Verification; Certification]

When disk OD is to be certified, the certification is applied to the data sectors and to the spare sectors in the groups. Certification can be performed by read/write check of the sectors in the groups.

Defective sectors found during certification are handled by the slipping replacement algorithm. The defective sectors must not be used for reading or writing.

If all spare sectors in a zone of disk OD are used during certification, disk OD is determined as defective. This disk OD is not used anymore.

[Slipping Replacement Algorithm]

The slipping replacement algorithm is individually applied to each and every group the data area in when certification is performed.

A defective data sector found during certification is replaced (exchanged) by the first good sector following the defective sector, and so causes a slip of one sector towards the end of the group. The last data sector slips into the spare sector area of the group.

The address of the defective sector is written in the primary defect lists (PDLs). The defective sector must not be used for recording user data. If no defective sectors are found during certification, an empty PDL is recorded.

The addresses of spare sectors, beyond the last data sector slipped into the spare sector, which are found to be defective during certification, are recorded in the PDL. In this case, the number of available spare sectors is reduced accordingly.

If the spare sector area of a group becomes exhausted during certification, the certification is regarded as a failure.

[Linear Replacement Algorithm]

The linear replacement algorithm can be applied to both defective sectors and deteriorated sectors by overwrite cycles found after certification. The linear replacement algorithm is executed in units of 16 sectors, i.e., in units of blocks (in units of 32 kbytes if one sector is 2 kbytes).

The defective block is replaced (exchanged) by the first available good spare block of the group. If there are no spare blocks left in the group, i.e., if there are less than 16 sectors left in the group, this information is recorded in the secondary defect lists (SDL). The defective block is replaced (exchanged) by the first available good spare block in another group. The address of the defective block and the address of its last replacement (exchange) block are recorded in the SDL.

The indication that there are no spare blocks left in the group is recorded in the SDL. Bit 0 of byte 29 when set to "1" indicates that there are no spare blocks left in group 0. When set to "0", this bit indicates that there are still spare blocks left in group 0. Bit 0 of byte 29 corresponds to group 0, bit 1 of byte 29 corresponds to group 1, bit 0 of byte 28 corresponds to group 8, and so on.

If a data block is found to be defective after certification, the block is regarded as a defective block and listed in the SDL with a new entry.

If a replacement block listed in the SDL is later found to be defective, the direct pointer method is used for registration into the SDL. In this direct pointer method, the SDL entry in which the defective replaced block has been registered is modified by changing the address of the replacement block from the defective one to a new one.

At the time of updating the SDL, the update counter in the SDL is incremented by one.

[Disks Not Certified]

The linear replacement algorithm can also be used for defective sectors found on disks which have not been certified. This replacement is executed in units of 16 sectors (i.e., in units of blocks).

A defective block is replaced (exchanged) by the first available good spare block of the group. If there are no spare blocks left in the group, this information is recorded in the secondary defect lists (SDL). The defective block is replaced (exchanged by the first available good spare block in another group. The address of the defective block and the address of its last replacement block are recorded in the SDL.

The indication that there are no spare blocks left in the group is recorded in the SDL. Bit 0 of byte 29 when set to "1" indicates that there are no spare blocks left in group 0. When set to "0", this bit indicates that there are still spare blocks left in group 0. Bit 0 of byte 29 corresponds to group 0, bit 1 of byte 29 corresponds to group 1, bit 0 of byte 28 corresponds to group 8, and so on.

If there exists a list of addresses of the defective sectors in the primary defect lists (PDLs), these defective sectors are skipped for use of the disk even if the disks are not certified. This process is the same as that for certified disks.

[Write Procedures]

When data is to be written in the sectors of a group, a defective sector listed in the primary defect lists (PDLs) is skipped. The data to be written in the defective sector is written in the next data sector according to the above-described slipping replacement algorithm. If a block to be written is listed in the secondary defect lists (SDLs), the data to be written in the block is written in a spare block pointed by the SDL according to the above-described linear replacement algorithm.

[Primary Defect List (PDL)]

A primary defect list (PDL) is always recorded in optical disk OD, and it may be empty.

A list of defective sectors may be obtained by a means other than certification of the disk.

The PDL contains the addresses of all defective sectors identified at initialization. These addresses are listed in ascending order. The PDL is recorded in the minimum number of sectors necessary. The PDL begins in the first user data byte of the first sector. All unused bytes of the last sector of the PDL are set to 0FFh. Information below is recorded in the PDL:

Byte PDL content 0 00h; PDL identifier 1 01h; PDL identifier

2 Number of addresses in he PDL; MSB

3 Number of addresses in the PDL; LSB

4 Address of the first defective sector (sector number; MSB)

5 Address of the first defective sector (sector number)

6 Address of the first defective sector (sector number)

7 Address of the first defective sector (sector number; LSB)

x-3 Address of the last defective sector (sector number; MSB)

x-2 Address of the last defective sector (sector number)

x-1 Address of the last defective sector (sector number)

x Address of the last defective sector (sector number; LSB)

*Note: if bytes 2 and 3 are set to 00h, byte 3 is the end of the PDL.

In the case of multiple-sector PDL, the list of addresses of the defective sectors continues with the first byte of the second and subsequent sectors. That is, the PDL identifier and the number of addresses of the PDL are present only in the first sector.

In an empty PDL, bytes 2 and 3 are set to 00h, and bytes 4 to 2047 are set to FFh.

Unused sectors in the DDS/PDL block are recorded with "FFh" data.

[Secondary Defect List (SDL)]

The secondary defect list (SDL) is created during initialization and used after certification. All disks have an SDL recorded during initialization.

The SDL contains entries in the form of addresses of defective data blocks and addresses of the spare defective block which replace them. Each entry in the SDL contains 8 bytes. Four each for the address of a defective block and four each for the address of its replacement block.

The list of addresses contains the first addresses of the defective blocks and their replacement blocks. The addresses of the defective blocks are listed in ascending order.

The SDL is recorded in the minimum number of sectors necessary. The SDL begins in the first user data byte of the first sector. All unused bytes of the last sector of the SDL are set to 0FFh. The following information is recorded in each of the four following SDLs.

If a replacement block listed in the SDL is later found to be defective, the direct pointer method is applied for registration into the SDL. In this direct pointer method, the SDL entry in which the defective replaced block has been registered is modified by changing the address of the replacement block from the defective replaced block to a new one. Therefore, the number of entries in the SDL remains unchanged by deteriorated sectors.

The information below is written in the SDL:

Byte SDL content 0 (00); SDL identifier 1 (02); SDL identifier 2 (00)

3 (01)

4 Update counter; MSB

5 Update counter

6 Update counter

7 Update counter; LSB 8 to 26 Reserved (00h)

27 to 29 Flags indicating that all spared sectors of a zone have been used

30 Number of entries in the SDL; MSB

31 Number of entries in the SDL; LSB

32 Address of the first defective block (sector number; MSB)

33 Address of the first defective block (sector number)

34 Address of the first defective block (sector number)

35 Address of the first defective block (sector number; LSB)

36 Address of the first replacement block (sector number; MSB)

37 Address of the first replacement block (sector number)

38 Address of the first replacement block (sector number)

39 Address of the first replacement block (sector number; LSB)

y-7 Address of the last defective block (sector number; MSB)

y-6 Address of the last defective block (sector number)

y-5 Address of the last defective block (sector number)

y-4 Address of the last defective block (sector number; LSB)

y-3 Address of the last replacement block (sector number; MSB)

y-2 Address of the last replacement block (sector number)

y-1 Address of the last replacement block (sector number)

y Address of the last replacement block (sector number; LSB)

*Note: each entry of bytes 30 to 31 is 8 bytes long.

In the case of a multiple-sector SDL, the list of addresses of the defective blocks and replacement blocks continues with the first byte of the second and subsequent sectors. That is, the contents of bytes 0 to 31 are present only in the first sector.

Unused sectors in the SDL block are recorded with "FFh" data.

The data format of an ECC block will be described below with reference to FIGS. 13 to 15.

As shown in FIG. 13, an ECC block comprises 16 sectors and is constituted by error correction codes for the horizontal direction and error correction codes for the vertical direction. A sector is constituted by 12 lines each consisting of 172 bytes.

The error correction code for the horizontal direction is constituted by 12 lines each consisting of 10 bytes. The error correction code for the vertical direction is constituted by 16 lines each consisting of 182 bytes. As shown in FIG. 15, the error correction code of one line for the vertical direction is added in correspondence with one sector.

Figure 14:
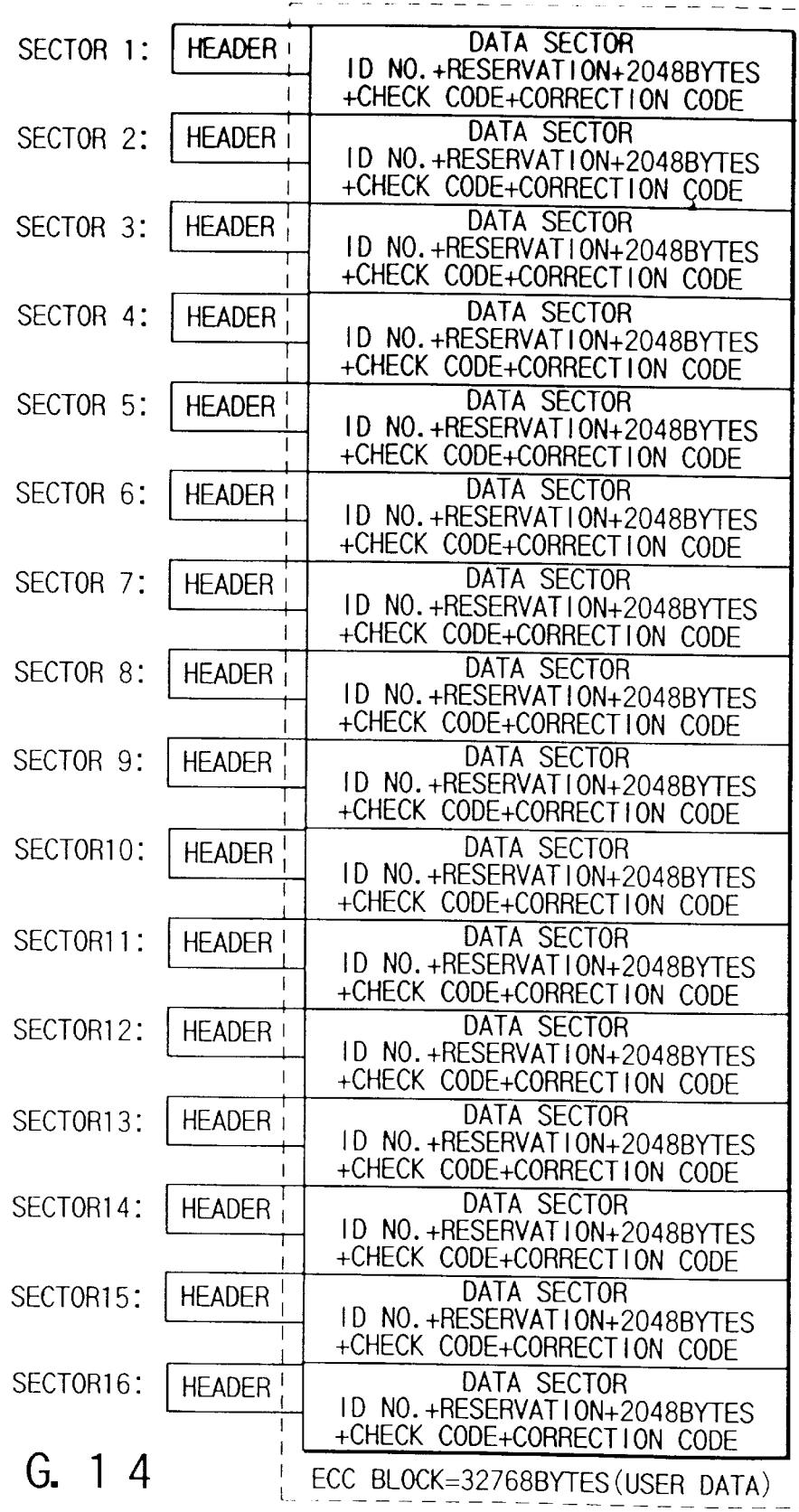
FIG. 14 is a view for explaining a state wherein in which headers are added to sectors contained in an ECC block.

In this format, a data sector is formed in units of 2,048 bytes (2 kbytes), as shown in FIG. 14. A header is added to each sector, and error correction codes are added to an ECC block consisting of the 16 sectors, i.e., 32,768 bytes (32 kbytes).

In actual data recording in the information recording/reproducing apparatus shown in FIG. 10, data is received in units of ECC blocks as described above, correction codes are added to the data, and the data is recorded on optical disk OD. In reproduction, the data of 32,768 bytes on optical disk OD and error correction codes added to the data are reproduced. After the data is appropriately corrected by error correction, data in a necessary size (e.g., pack data of 2 kbytes) is transferred to an external unit (e.g., a data decoder not illustrated in FIG. 10).

The structure of header portion 100 added to each sector 300 formed on optical disk OD as shown in FIG. 11 will be described next with reference to FIG. 16.

Header portion 100 is constituted by PLL (Phase Locked Loop) pull-in code 102, sync code 104 as a continuous data pattern for PLL, and physical block number + CRC (error correction code) 106 (of. FIG. 17).

As shown in FIG. 17, CRC code 106B is added to each logical block code 106A.

Replacement according to the present invention will be described below.

If a defect which cannot be corrected by an ECC is generated on optical disk OD, data cannot be properly recorded/reproduced. To prevent this, replacement of data is performed when a defect is generated on optical disk OD.

More specifically, when recorded data is reproduced, and an abnormality (discordance between recorded data and reproduced data) is detected, the data recorded in a defective sector (or a defective block) where the abnormality is detected is recorded in a normal sector (or a normal block) of another recording area. The data at the replacement destination is reproduced in reproduction. With this replacement, the reliability of recorded data can be ensured.

There are two replacement techniques. One is called slipping replacement (primary replacement). In this method, data in all areas on optical disk OD are checked in advance in manufacturing/delivery of optical disk OD, and the address data of an area (a sector or a block) where a defect is found is registered in defect management data recording area 502 shown in FIG. 12. The defect found at this time is called an initial defect. When actual data is to be recorded in the area with the initial defect, the data is not recorded in this area with the initial defect, and the write target is slipped to the next area (adjacent area) to record the data.

The other is called linear replacement (secondary replacement). In this method, every time-actual data is recorded, the recorded data is checked (read-after-write). If a defect is detected, the data is rewritten in a predetermined replacement area. The defect detected at this time is called a secondary defect.

Various replacement techniques are available in terms of the recording format of optical disk OD. In the present invention, slipping replacement is performed in units of data sectors of 2 kbytes (2,048 bytes), and linear replacement is performed in units of ECC blocks of 32 kbytes (32,768 bytes).

When continuous data such as a moving image or sound is to be recorded, only slipping replacement can be used. If an abnormality is detected on optical disk OD, the abnormal sector (a sector of 2 kbytes) is slipped to record data. In this case, continuous data such as a moving picture or sound can be recorded without interruption because only a short wait time is necessary for replacement in recording/reproducing the data. If slipping replacement is performed in units of 32 kbytes, recording of data of 32 kbytes is interrupted during replacement, so continuous data can hardly be recorded. In real-time recording of data such as a moving picture or sound, slipping replacement performed in units of 32 kbytes results in a too large slip distance (data length), so digital recording of a moving picture or sound without interruption is likely to be disabled.

Linear replacement is a technique of obtaining a highly reliable data. Since recording/reproduction is originally performed in units of 32 kbytes in linear replacement, replacement may be performed in units of 32 kbytes. If data as a replacement target of 32 kbytes is to be reproduced by linear replacement in units of 2 kbytes, another replacement area must be accessed during reproduction. In this case, an operation of accessing the replacement area, reproducing the replaced data, and continuing reproduction in the original area must be repeated for every defective sector, resulting in a decrease in data reproduction rate.

The advantage in performing slipping replacement in units of sectors, the advantage in performing linear replacement in units of ECC blocks, the disadvantage in performing slipping replacement in units of ECC blocks, and the disadvantage in performing linear replacement in units of sectors will be described below with reference to FIGS. 18 to 21.

First, the disadvantage in performing slipping replacement in units of ECC blocks will be described with reference to FIG. 18.

Figure 18:
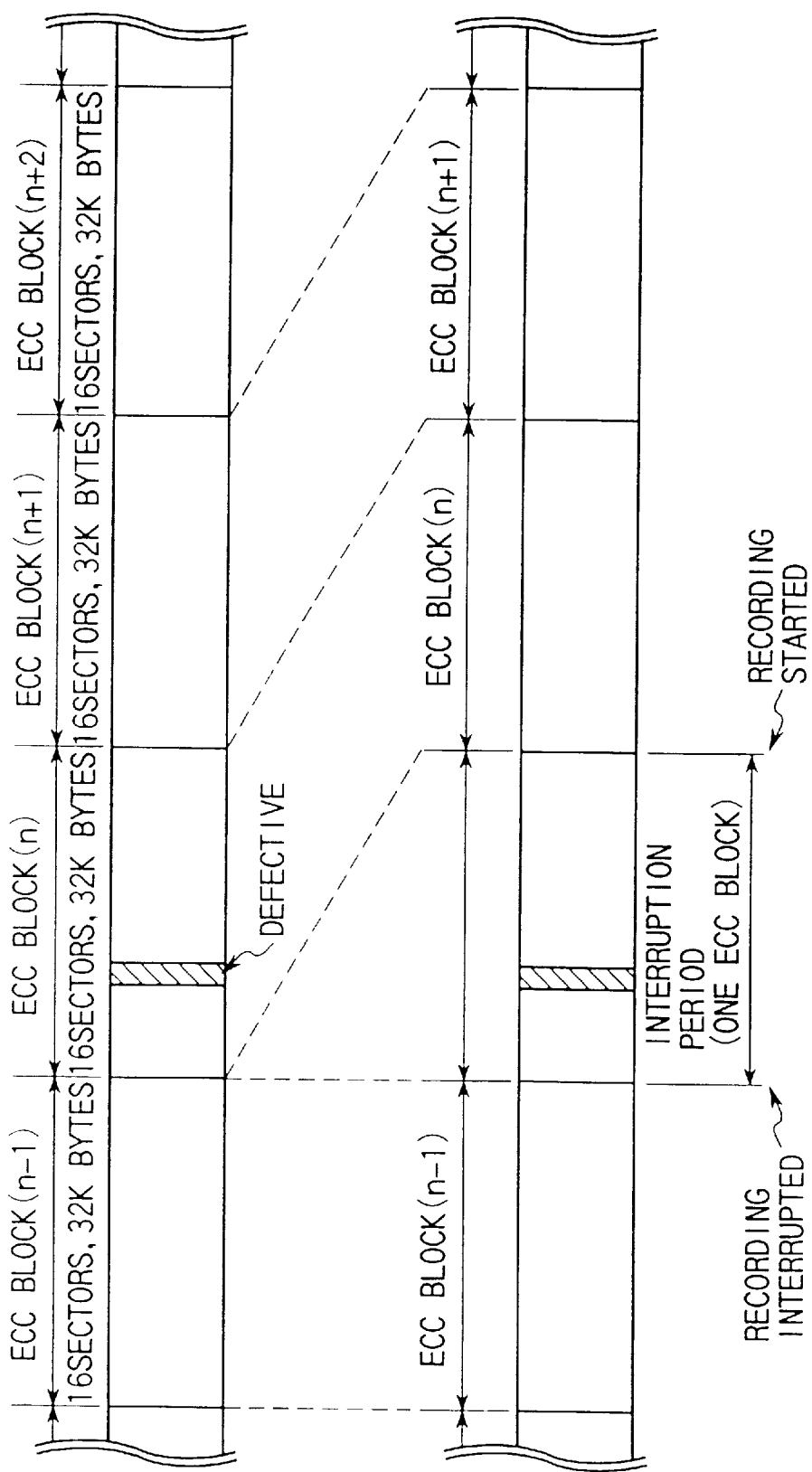
FIG. 18 is a view for explaining slipping replacement in units of ECC blocks.

In FIG. 18, assume that an ECC block (n−1), an ECC block (n), an ECC block (n+1), an ECC block (n+2), . . . are recorded on optical disk OD. If an initial defect is detected in a sector of the ECC block (n) in manufacturing/delivery of optical disk OD, address data recorded in a header portion which indicates the position of the sector with the initial defect is registered in defect management data recording area 502 shown in FIG. 12.

In actual data recording, the ECC block (n) containing the initial defective sector is slipped to the next ECC block by slipping replacement on the basis of the data recorded in defect management data recording area 502. More specifically, after the ECC block (n−1) is recorded, recording is interrupted for a period corresponding to one ECC block (32 kbytes). For this reason, real-time recording of continuous data such as a moving picture or sound is difficult. This is the disadvantage in performing slipping replacement in units of ECC blocks.

Second, the advantage in performing slipping replacement in units of sectors will be described with reference to FIG. 19.

In FIG. 19, assume that the ECC block (n−1), the ECC block (n), the ECC block (n+1), the ECC block (n+2) . . . are recorded on optical disk OD. If an initial defect is detected in a sector of the ECC block (n) in manufacturing/delivery of optical disk OD, address data which indicates the position of the sector with the initial defect is registered in defect management data recording area 502.

In actual data recording, the initial defective sector is slipped to the next sector in units of sectors by slipping replacement on the basis of the data recorded in defect management data recording area 502. More specifically, after the first sector ahead of the initial defective sector is recorded, recording is interrupted for a period corresponding to only one sector (2 kbytes) due to slipping replacement. Recording is interrupted for a period much shorter than that of the interrupt of recording in slipping replacement performed in units of ECC blocks, i.e., a period corresponding to 32 kbytes. The data length of 2 kbytes can normally be absorbed by a buffer memory (not shown) in the apparatus. Therefore, continuous data such as a moving picture or sound can be recorded in real time without interrupt. This is the advantage in performing slipping replacement in units of sectors.

Third, the disadvantage in performing linear replacement in units of sectors will be described with reference to FIG. 20.

Figure 20:
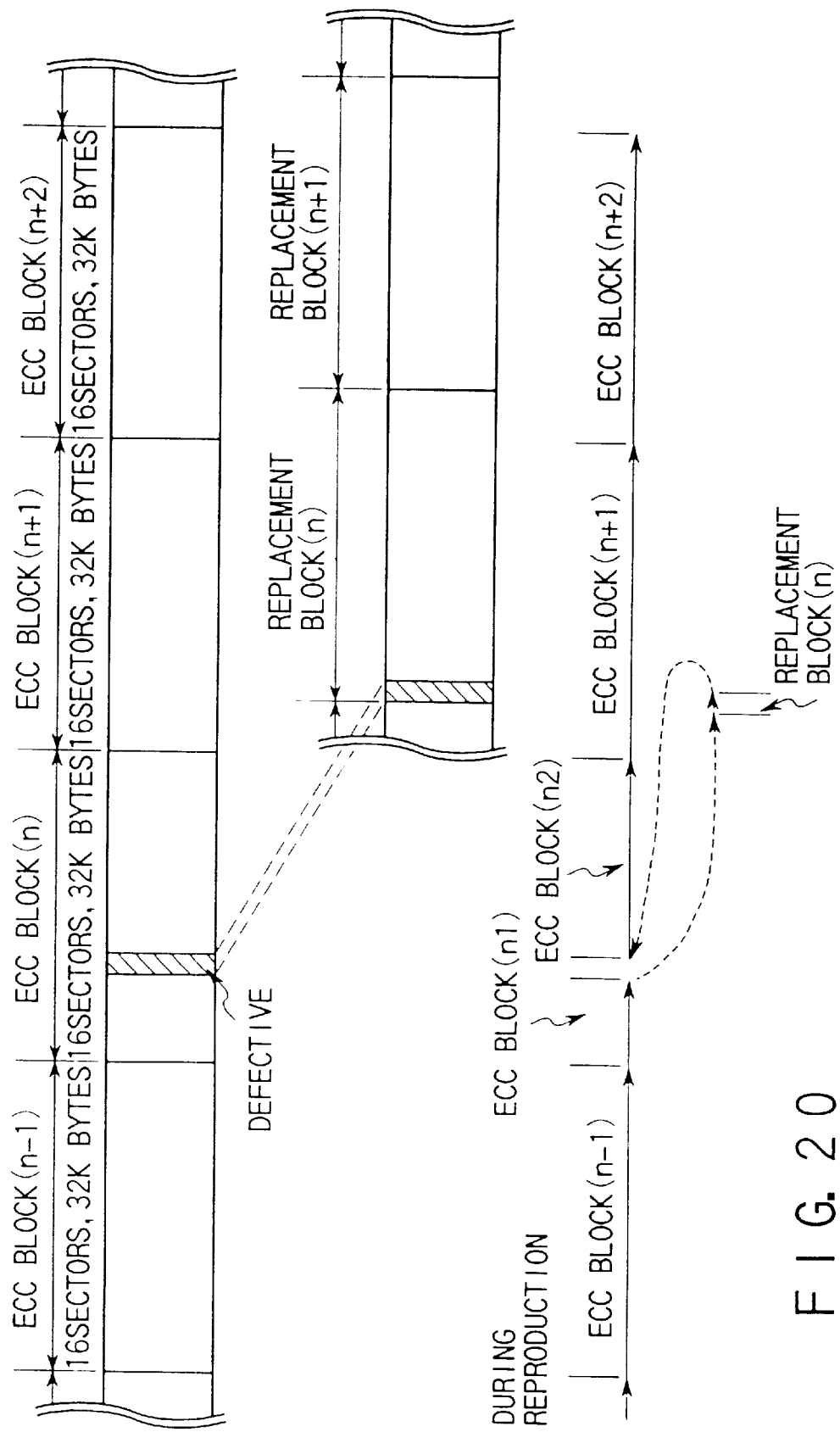
FIG. 20 is a view for explaining linear replacement in units of sectors.

In FIG. 20, assume that the ECC block (n−1), the ECC block (n), the ECC block (n+1), the ECC block (n+2), . . . are recorded on optical disk OD. In addition, assume that a replacement block (n), a replacement block (n+1), . . . are recorded on optical disk OD. In actual data recording in optical disk OD, if a secondary defect is detected in a sector of the ECC block (n), the secondary defective sector is replaced by the replacement block In) and recorded by linear replacement in units of sectors. At this time, data representing that replacement has been performed is registered in defect management data recording area 502.

The data recorded in replacement is reproduce in the order of ECC block (n−1)→ECC block (n1)→replacement block (n)→ECC block (n2)→ECC block (n+1)→ECC block (n+2) →, . . . In this case, the replacement block is accessed during reproduction of one ECC block to reproduce the data which is replaced and recorded, and thereafter, the original block is accessed again to continue reproduction. Since the replacement block must be accessed, the data reproduction rate is decreased. This is the disadvantage in performing linear replacement in units of sectors.

Figure 21:
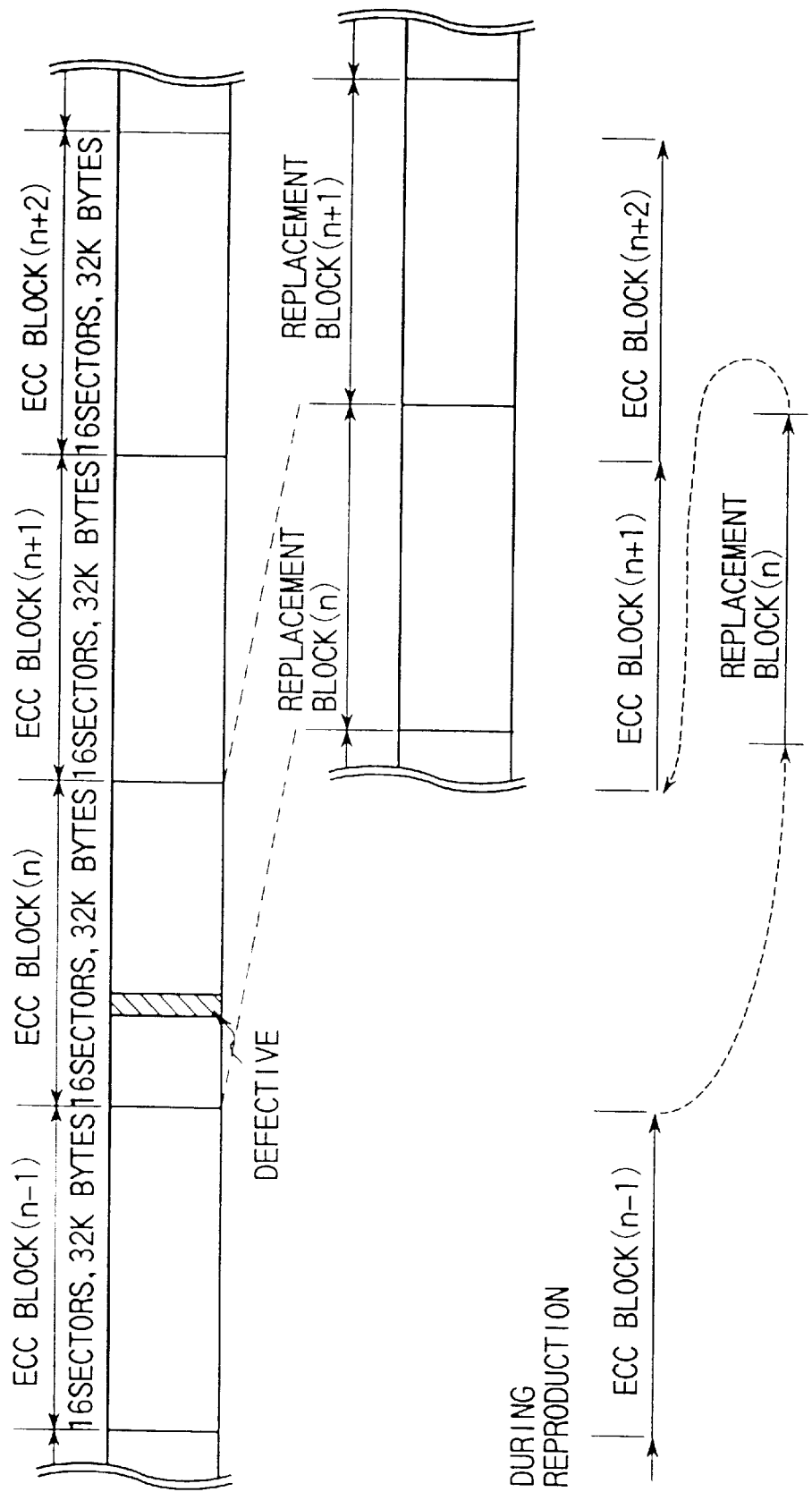
FIG. 21 is a view for explaining linear replacement in units of ECC blocks.

Fourth, the advantage in performing linear replacement in units of ECC blocks will be describe with reference to FIG. 21.

In FIG. 21, assume that the ECC block (n−1), the ECC block (n), the ECC block (n+1), the ECC block (n+2), . . . are recorded on optical disk OD. In addition, assume that the replacement block n), the replacement block (n+1), . . . are recorded on optical disk OD. In actual data recording, if a secondary defect is detected in a sector of the ECC block (n), the ECC block (n) containing the secondary defective sector is replaced by the replacement block n) and recorded by linear replacement in unit of blocks. At this time, data representing that replacement has been performed is registered in defect management data recording area 502.

The data recorded in this manner is reproduced in the order of ECC block (n−1)→replacement block (n)→ECC block (n+1)→ECC block (n+2)→ . . . . In this case, the replacement block need not be accessed during reproduction of one ECC block. To reproduce the defective block, the block address only need be designated, and reproduction is performed at almost the same speed as that in normal block reproduction. The only difference is that a slightly longer time is required to access the replacement block because it is located at a position slightly physically separated from the continuum of a plurality of normal blocks. For this reason, as long as the optical disk driving apparatus has a predetermined access speed or higher, a smooth recording/ reproducing rate can be obtained without posing any actual problem on the recording/reproducing rate. This is the advantage in performing linear replacement in units of ECC blocks.

The data recorded in the defect management table in defect management data recording area 502, representing that "replacement has been performed", is recorded to specify the correspondence between the address data of the replacement source and the address data of the replacement destination. Referring to this table data, access from the area of the replacement source to the area of the replacement destination is enabled.

If linear replacement is performed in units of ECC blocks, the position of an ECC block can be known on the basis of the address data of a sector contained in this ECC block. Alternatively, the address data may be added to the ECC block itself.

Determination whether replacement is performed will be described below. Whether replacement is performed must be determined considering that the unit of error correction is an ECC block (32 kbytes). In the present invention, replacement is performed in the following cases:

(a) when a header portion before a sector of an ECC block cannot be reproduced;

(b) when the number of errors in a sector of an ECC block exceeds the first defined value;

(c) when the number of errors in a sector exceeds not the first defined value but the second defined value, and the number of errors in the entire ECC block exceeds the third defined value; and (d) when the number of errors in a sector exceeds not the first defined value but the second defined value, and the number of error sectors in the entire ECC block is equal to or larger than the fourth defined value.

In the present invention, when conditions (a) and (b) are satisfied, slipping replacement is performed. The slipping replacement is performed in units of sectors, as a matter of course.

In an actual DVDRAM format, each sector has 13 ECC lines, and whether an error is present can be checked in units of lines. Each line has a length of 182 bytes, and whether the number of errors in the bytes is 1, 2, 3, 4, or 5 or more can be determined. Therefore, the first defined value in (b) is reasonably "5 lines each containing 4 or more error bytes".

In (c) and (d), it can be determined that the entire ECC block has no reliable data. Therefore, the entire ECC block may be subjected to slipping replacement.

If one of conditions (a) to (d) is satisfied, linear replacement is performed. Alternatively, linear replacement may be performed only when one of conditions (c) and (d) is satisfied. The linear replacement is performed in units of ECC blocks, as a matter of course.

The reason for latter, i.e., why linear replacement is performed only when one of conditions (c) and (d) is satisfied is as follows. When only one sector in the ECC block is defective, although the number of errors is large, the data of the entire ECC block can be corrected. An ECC block has a total of 208 lines. Sixteen lines each containing 5 or more errors can be corrected at maximum. It is therefore preferable that the second defined value be "3 lines each containing 4 or more error byes", the third defined value be "10 lines each containing 4 or more error bytes", and the fourth defined value be "2 sectors".

A physical address is recorded in the mastering process and therefore cannot be rewritten. In the DVDRAM format, however, a logical address in a data sector can be rewritten because it is provided in each sector data. Logical data is recorded in address data in each sector. In this arrangement, when data is reproduced in accordance with the physical address, the logical address in the sector data can be checked.

Figure 23:
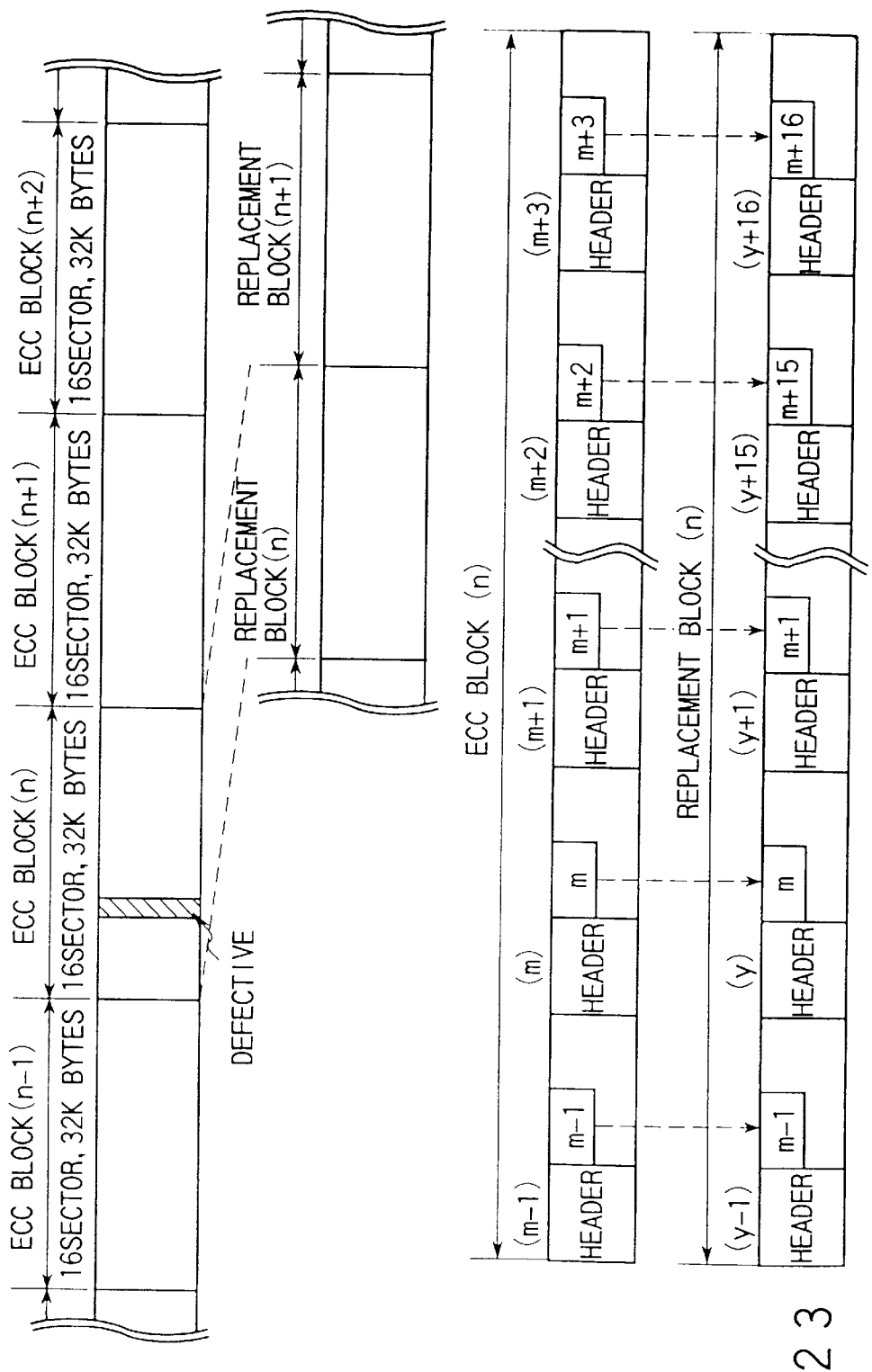
FIG. 23 is a view for explaining the relation between the physical block number and the logical block number when linear replacement is carried out in units of ECC blocks.

In the DVDRAM format, a header prepared in the mastering process is formed before each sector, as shown in FIG. 23. A physical address indicating a physical position on optical disk OD, i.e., on a recording track is recorded in this header. The physical address is mainly used to access data and corresponds to a physical block number shown in FIGS. 24 and 25.

In addition to the physical address, a logical address indicating a logical position on optical disk OD, i.e., on a track is recorded in each sector. The logical address sometimes differs from the physical address because of replacement, and a detailed example thereof will be described below. The logical address corresponds to a logical block number shown in FIGS. 24 and 25.

A case in which the physical block number differs from the logical block number because of replacement will be described below with reference to FIGS. 22 to 25.

The relation between the physical block number and the logical block number when slipping replacement is carried out in units of sectors will be described first.

Figure 22:
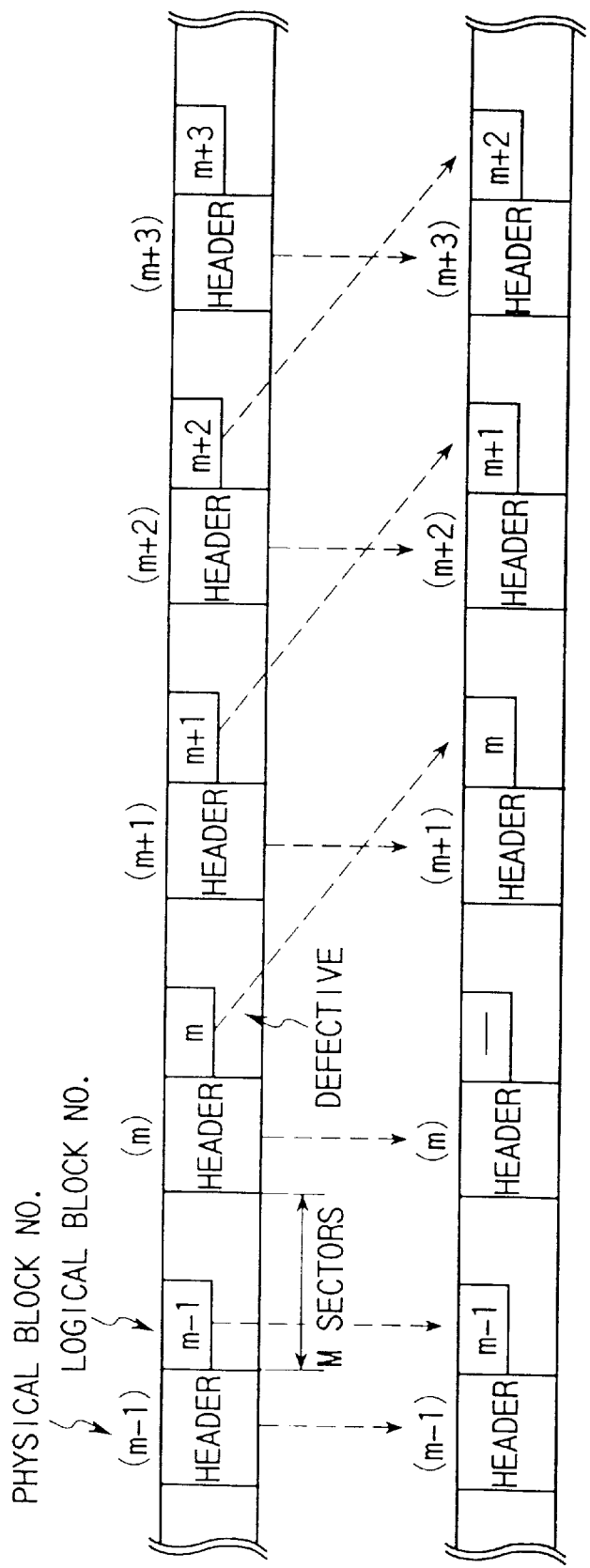
FIG. 22 is a view for explaining the relation between a physical block number and a logical block number when slipping replacement is carried out in units of sectors.

In FIG. 22, assume that a physical block number (m−1), a physical block number (m), a physical block number (m+1), a physical block number (m+2), and a physical block number (m+3) are added to the headers of sectors as header numbers. In addition, assume that a logical block number (m−1), a logical block number (m), a logical block number (m+1), a logical block number (m+2), and a logical block number (m+3) are added to the sectors as sector ID numbers corresponding to the header numbers.

If an initial defect is found in a sector with the physical block number (m) and the logical block number (m) in manufacturing/delivery of optical disk OD, the sector with the initial sector is slipped to the next sector by performing slipping replacement in units of sectors. At this time, the physical block number does not change while the logical block number changes in accordance with slipping replacement. More specifically, since the sector with the physical block number (m) is not used anymore, the sector is skipped without being added with any logical block number. For this reason, subsequent logical block numbers shift. More specifically, the logical block number (m) is assigned to the physical block number (m+1), the logical block number (m+1) is assigned to the physical block number (m+2), and the logical block number (m+2) is assigned to the physical block number (m+3).

Figure 24:
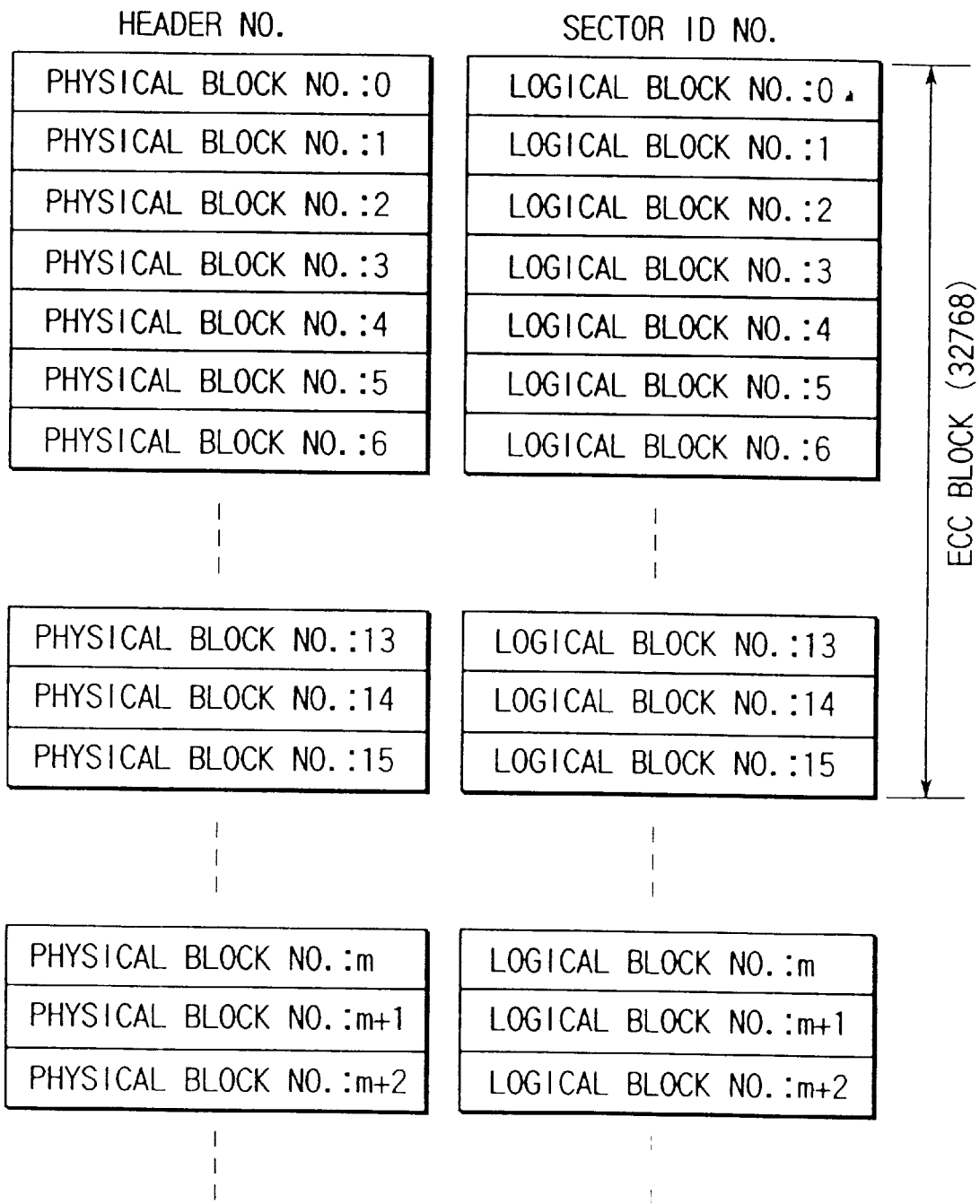
FIG. 24 is a view for explaining the relation between the physical block number and the logical block number in certification.
Figure 25:
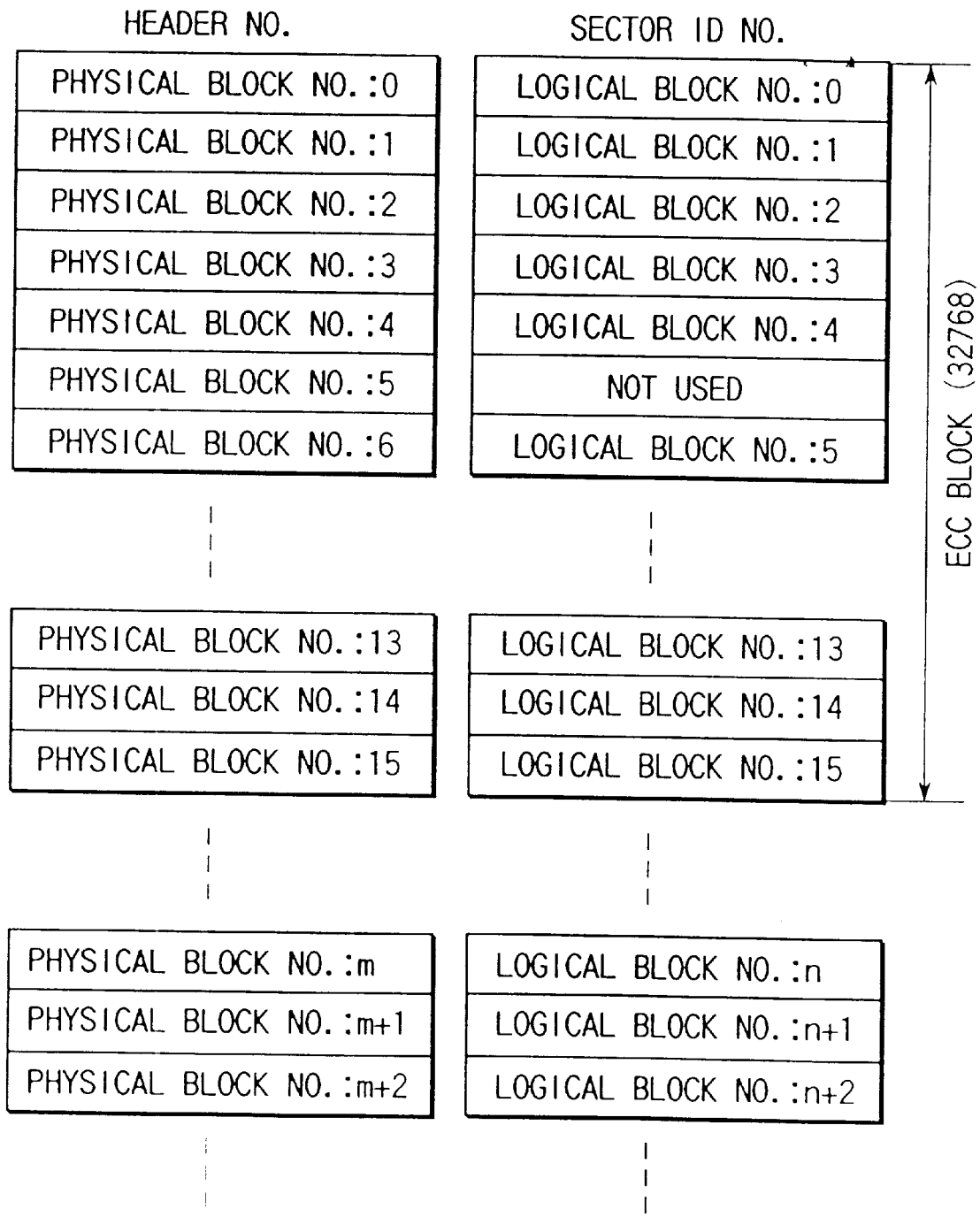
FIG. 25 is a view for explaining the relation between the physical block number and the logical block number when slipping replacement is carried out in units of sectors.

FIGS. 24 and 25 show a detailed example of the above-described contents (the relation between the physical block number and the logical block number, which chances in accordance with replacement). FIG. 24 shows the relation between the header number and the sector ID number in certification in manufacturing/delivery of optical disk OD. FIG. 24 shows that the header number (physical block number) matches the sector ID number (logical block number).

Assume that physical block number 5 has an initial defect. In this case, the relation between the header number and the sector ID number shown in FIG. 25 is obtained by slipping replacement.

The relation between the physical block number and the logical block number when linear replacement is carried out in units of ECC blocks will be described next.

In FIG. 23, assume that the ECC block (n−1), the ECC block (n), the ECC block (n+1), the ECC block (n+2), . . .

are recorded on optical disk OD. In addition, assume that the replacement block (n), the replacement block (m+1), ... are recorded on optical disk OD.

Assume that, in actual data recording, it is found that a sector of the ECC block (n) has a secondary defect (a defect which is not present when optical disk OD is a new disk but generated during use of optical disk OD). The ECC block (n) containing this secondary defective sector is replaced by the replacement block (n) and recorded by linear replacement.

As shown in the intermediate and lower stages of FIG. 23, assume that the physical block number (m−1), the physical block number (m), the physical block number (m+1), ..., a physical block number (m+15), and a physical block number (m+16) are added, as header numbers, to the headers of sectors of the ECC block (n) as a replacement source. In addition, assume that the logical block number (m−1), the logical block number (m), the logical block number (m+1), ..., a logical block number (m+15), and a logical block number (m−16) are added to the sectors as sector ID numbers corresponding to the header numbers.

As shown in the lowermost stage of FIG. 23, a physical block number (y−1), a physical block number (y), a physical block number (y+1), ..., a physical block number (y+15), and a physical block number (y+16) are added, as header numbers, to the headers of the sectors of the replacement block (n) as a replacement destination.

When replacement is performed between the ECC block (n) as the replacement source and the replacement block (n) as the replacement destination to which the header numbers and sector ID numbers are added, the sector ID number of the defective sector of the replacement source is added as the sector ID number of the replacement destination. More specifically, the logical block number (m−1), the logical block number (m), the logical block number (m+1), ..., the logical block number (m+15), and the logical block number (m+16) are added as the sector ID numbers of the replacement block (n) as the replacement destination in correspondence with the header numbers of the replacement block.

In the DVDRAM format, scramble processing is performed for recorded data. The scramble pattern is determined depending on the logical block number. In the present invention, therefore, even when replacement is performed, the logical block number described in sector data of the replacement source is the same as that of the replacement destination, so scramble processing need not be performed again.

The procedures of the above-described slipping replacement and linear replacement will be described below with reference to flow charts shown in FIGS. 26 and 27.

The flow chart in FIG. 26 assumes that optical disk OD is used in, e.g., manufacturing/delivery for the first time. Data for checking (dummy data) is recorded on the full areas of optical disk OD (step ST100). By reproducing the data for checking recorded on the full areas of optical disk OD, the full areas of disk OD are checked (step ST102). If a defect (initial defect) is detected, the address data of the defective area is registered in defect management data recording area 502 shown in FIG. 12 (step ST104).

The flow chart in FIG. 27 assumes that data is to be actually recorded in optical disk OD after initialization. First, a target area of optical disk OD is accessed (step ST200) to start actual data recording (step ST202).

In actual data recording, if the target area has an initial defect (NO in step ST204), slipping replacement is performed (step ST206), and actual data recording is performed in the next sector (step ST208).

When the actual data is recorded in an ECC block, i.e., 16 sectors (YES in step ST300), recording is stopped (step ST302). If recording for 16 sectors is not completed (NO in step st300), processing in steps ST204 to ST300 is repeated until recording is stopped.

If an instruction for executing verification is output from the host apparatus (information recording/reproducing apparatus) (NO in step ST304), the data recorded in steps ST202 to ST300 is reproduced and checked (step ST306). If no secondary defect is detected (YES in step ST308), the processing shown in FIG. 27 is ended. If verification is not executed in step ST304 (YES in step ST304), the processing in step ST304 is ended.

When a secondary defect is detected (YES in step ST308) after the instruction for verification is output (NO in step ST304), linear replacement is performed (step ST400). In this case, data is recorded in the replacement block again, and the recorded data is checked again. When the linear replacement is completed, the processing in FIG. 27 is ended.

According to the above embodiment, even when the recording unit is larger than the physical sector unit (e.g., 32 kbytes), replacement can be realized at a high processing efficiency without posing any logical problem.

In addition, when an operation of reading a file including data of a defective block is performed by the user in data read access after write access, the firmware or system software of the disk write apparatus reads out data to be stored in the error detection block of data area DA1 from replacement area RA1. Since the rotation speed of disk OD is kept to be N1, replacement is performed at a high speed. Therefore, when the readout data is music information, the reproduced sound is unlikely to be interrupted even by replacement during reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An information recording disk having a plurality of tracks and a plurality of sectors on each of said tracks, said information recording disk being constructed and arranged to be rotated at one of a plurality of rotation speeds to record information, said information recording disk comprising:

a predetermined data area formed spirally or concentrically with a center of rotation of said information recording disk, in which said information is recorded when said information recording disk is rotated at a predetermined rotation speed;

a predetermined replacement area formed spirally or concentrically with said center of rotation on a side closer to said center of rotation than said predetermined data area, in which, upon detecting a write error in said predetermined data area during rotation of said information recording disk at said predetermined rotation speed, write information associated with said write error is recorded in a block of said sectors within said predetermined replacement area at said predetermined rotation speed instead of within said predetermined data area; and a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

2. The information recording disk according to claim 1, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is located on a side closer to said center of rotation than said corresponding data area, said replacement areas being arranged such that a rotation speed for recording in each of said replacement areas is a same rotation speed for recording in said corresponding data area.

3. An information recording disk, having a plurality of tracks and a plurality of sectors on each of said tracks, said information recording disk being constructed and arranged to be constructed and arranged to be rotated at one of a plurality of rotation speeds to record information, comprising:

a first data area formed spirally or concentrically with a center of rotation of said information recording disk, in which information is recorded when said information recording disk is rotated at a first rotation speed;

a first replacement area formed spirally or concentrically with said center of rotation on a side closer to said center of rotation than said first data area, in which, upon detecting a write error in said first data area during rotation of said information recording disk at said first rotation speed, write information associated with said write error is recorded in a block of said sectors within said first replacement area at said first rotation speed instead of within said first data area;

a second data area formed spirally or concentrically with said center of rotation, in which said information is recorded when said information recording disk is rotated at a second rotation speed;

a second replacement area formed spirally or concentrically with said center of rotation on a side closer to said center of rotation than said second data area, in which, upon detecting a write error in said second data area during rotation of said information recording disk at said second rotation speed, write information associated with said write error in said second data area is recorded within said second replacement area at said second rotation speed instead of within said second data area; and a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

4. The information recording disk according to claim 3, wherein:

said first data area is closer to said center of rotation than said second data area, and said first rotation speed is faster than said second rotation speed.

5. The information recording disk according to claim 4, wherein:

said information is recorded to said information recording disc in an ECC block, said ECC block comprising 16 sectors.

6. The information recording disk according to claim 3, wherein:

said information is recorded to said information recording disc in an ECC block, said ECC block comprising 16 sectors.

7. A method of performing replacement of write error information in an information recording disk having a plurality of tracks and a plurality of sectors on each of said tracks, comprising:

skipping a defective sector when writing said information to said information recording disk and writing said information associated with said defective sector in a next sector, not having a defect, on said information recording disk, an address of said defective sector being recorded in a defect list on said information recording disk during initialization of said information recording disk;

performing replacement only in a first replacement area for a write error generated in a first data area; and performing replacement only in a second replacement area for a write error generated in a second data area, wherein:

said first data area is formed spirally or concentrically with a center of rotation of said information recording disk, in which information is recorded when said information recording disk is rotated at a first rotation speed, said first replacement area is formed spirally or concentrically with said center of rotation on a side closer to said center of rotation than said first data area, in which, upon detecting a write error in said first data area during rotation of said information recording disk at said first rotation speed, write information associated with said write error is recorded in a block of said sectors within said first replacement area at said first rotation speed instead of within said first data area, said second data area is formed spirally or concentrically with said center of rotation, in which said information is recorded when said information recording disk is rotated at a second rotation speed, and said second replacement area is formed spirally or concentrically with said center of rotation on a side closer to said center of rotation than said second data area, in which, upon detecting a write error in said second data area during rotation of said information recording disk at said second rotation speed, write information associated with said write error in said second data area is recorded within said second replacement area at said second rotation speed instead of within said second data area.

8. The method according to claim 7 wherein:

said first data area is closer to said center of rotation than said second data area, and said first rotation speed is faster than said second rotation speed.

9. An information recording disk, having a plurality of tracks and a plurality of sectors on each of said tracks, said information recording disk being constructed and arranged to be rotated at one of a plurality of rotation speeds to record information, comprising:

a predetermined data area formed spirally or concentrically with a center of rotation of said information recording disk, in which said information is recorded when said information recording disk is rotated at a predetermined rotation speed;

a predetermined replacement area formed spirally or concentrically with said center of rotation on a side far from said center of rotation than said predetermined data area, in which, upon detecting a write error in said predetermined data area during rotation of said disk at said predetermined rotation speed, write information associated with said write error is recorded in a block of said sectors within said predetermined replacement area at said predetermined rotation speed instead of within said predetermined data area; and a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

10. The information recording disk according to claim 9, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is located on a side farther from said center of rotation than said corresponding data area, said replacement areas being arranged such that a rotation speed for recording in each of said replacement areas is a same rotation speed for recording in said corresponding data area.

11. The information recording disk according to claim 9, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is surrounded by said corresponding data area, said replacement areas being arranged such that a rotation speed for recording in each of said replacement areas is a same rotation speed for recording in said corresponding data area.

12. The information recording disk according to claim 9, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area, said replacement areas being arranged such that a rotation speed for recording in each of said replacement areas is a same rotation speed for recording in said corresponding data area.

13. An information recording disk, having a plurality of tracks and a plurality of sectors on each of said tracks, said information recording disk being constructed and arranged to be rotated at one of a plurality of rotation speeds to record information, comprising:

a first data area formed spirally or concentrically with a center of rotation of said information recording disk, in which said information is recorded when said information recording disk is rotated at a first rotation speed;

a first replacement area formed spirally or concentrically with said center of rotation on a side far from said center of rotation than said first data area, in which, upon detecting a write error in said first data area during rotation of said information recording disk at said first rotation speed, write information associated with said write error in said first data area is recorded in a block of said sectors within said first replacement area at said first rotation speed instead of within said first data area;

a second data area formed spirally or concentrically with said center of rotation, in which information is recorded when said information recording disk is rotated at a second rotation speed;

a second replacement area formed spirally or concentrically with said center of rotation on a side a far from said center of rotation than said second data area, in which, upon detecting a write error in said second data area during rotation of said information recording disk at said second rotation speed, write information associated with said write error in said second data area is recorded in a block of said sectors within said second replacement area at said second rotation speed instead of within said second data area; and a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

14. The information recording disk according to claim 13, wherein:

said first data area is closer to said center of rotation than said second data area, and said first rotation speed is faster than said second rotation speed.

15. The information recording disk according to claim 14, wherein:
said information is recorded to said information recording disc in an ECC block, said ECC block comprising 16 sectors.

16. The information recording disk according to claim 13, wherein:
said information is recorded to said information recording disc in an ECC block, said ECC block comprising 16 sectors.

17. A method of performing replacement of write error information in an information recording disk having a plurality of tracks and a plurality of sectors on each of said tracks, comprising:
skipping a defective sector when writing said information to said information recording disk and writing said information associated with said defective sector in a next sector, not having a defect, on said information recording disk, an address of said defective sector being recorded in a defect list on said information recording disk during initialization of said information recording disk;
performing replacement only in a first replacement area for a write error generated in a first data area; and
performing replacement only in a second replacement area for a write error generated in a second data area wherein:
said first data area is formed spirally or concentrically with a center of rotation of said information recording disk, in which said information is recorded when said information recording disk is rotated at a first rotation speed,
said first replacement area is formed spirally or concentrically with said center of rotation on a side far from said center of rotation than said first data area, in which, upon detecting a write error in said first data area during rotation of said information recording disk at said first rotation speed, write information associated with said write error in said first data area is recorded in a block of said sectors within said first replacement area at said first rotation speed instead of within said first data area,
said second data area is formed spirally or concentrically with said center of rotation, in which information is recorded when said information recording disk is rotated at a second rotation speed, and
said second replacement area is formed spirally or concentrically with said center of rotation on a side a far from said center of rotation than said second data area, in which, upon detecting a write error in said second data area during rotation of said information recording disk at said second rotation speed, write information associated with said write error in said second data area is recorded in a block of said sectors within said second replacement area at said second rotation speed instead of within said second data area.

18. The method according to claim 17 wherein:
said first data area is closer to said center of rotation than said second data area, and
said first rotation speed is faster than said second rotation speed.

19. An information recording disk, having a plurality of tracks and a plurality of sectors on each of said tracks, said information recording disk being constructed and arranged to be rotated at one of a plurality of rotation speeds to record information, comprising:
a predetermined data area formed spirally or concentrically with a center of rotation of said information recording disk, in which said information is recorded when said information recording disk is rotated at a predetermined rotation speed;
a predetermined replacement area formed spirally or concentrically with said center of rotation surrounded by said predetermined data area, in which, upon detecting a write error in said predetermined data area during rotation of said information recording disk at said predetermined rotation speed, write information associated with said write error is recorded in a block of said sectors within said predetermined replacement area at said predetermined rotation speed instead of within said predetermined data area; and
a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

20. An information recording disk, having a plurality of tracks and a plurality of sectors on each of said tracks, said information recording disk being constructed and arranged to be rotated at one of a plurality of rotation speeds to record information, comprising:
a first data area formed spirally or concentrically with a center of rotation of said information recording disk, in which said information is recorded when said information recording disk is rotated at a first rotation speed;
a first replacement area formed spirally or concentrically with said center of rotation in said first data area, in which, upon detecting a write error in said first data area during rotation of said information recording disk at said first rotation speed, write information associated with said write error in said first data area is recorded in blocks of said sectors within said first replacement area at said first rotation speed instead of within said first data area;
a second data area formed spirally or concentrically with said center of rotation, in which said information is recorded when said information recording disk is rotated at a second rotation speed;
a second replacement area formed spirally or concentrically with said center of rotation in said second data area, in which, upon detecting a write error in said second data area during rotation of said information recording disk at said second rotation speed, write information associated with said write error in said second data area is recorded in blocks of said sectors within said second replacement area at said second rotation speed instead of within said second data area; and
a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

21. The information recording disk according to claim 20, wherein:
said first data area is closer to said center of rotation than said second data area, and
said first rotation speed is faster than said second rotation speed.

22. The information recording disk according to claim 21, wherein:
said information is recorded to said information recording disc in an ECC block, said ECC block comprising 16 sectors.

23. The information recording disk according to claim 20, wherein:
said information is recorded to said information recording disc in an ECC block, said ECC block comprising 16 sectors.

24. A method of performing replacement of write error information in an information recording disk having a plurality of tracks and a plurality of sectors within each of said tracks, comprising:
skipping a defective sector when writing said information to said information recording disk and writing said information associated with said defective sector in a next sector, not having a defect, on said information recording disk, an address of said defective sector being recorded in a defect list on said information recording disk during initialization of said information recording disk;
performing replacement only in a first replacement area for a write error generated in a first data area; and
performing replacement only in a second replacement area for a write error generated in a second data area wherein:
said first data area is formed spirally or concentrically with a center of rotation of said information recording disk, in which said information is recorded when said information recording disk is rotated at a first rotation speed,
said first replacement area is formed spirally or concentrically with said center of rotation in said first data area, in which, upon detecting a write error in said first data area during rotation of said information recording disk at said first rotation speed, write information associated with said write error in said first data area is recorded in blocks of said sectors within said first replacement area at said first rotation speed instead of within said first data area,
said second data area is formed spirally or concentrically with said center of rotation in said first data area, in which, upon detecting a write error in said second data area during rotation of said information recording disk at said second rotation speed, write information associated with said write error in said second data area is recorded in blocks of said sectors within said second replacement area at said second rotation speed instead of within said second data area, and
said second replacement area is formed spirally or concentrically with said center of rotation in said second data area, in which, upon detecting a write error in said second data area during rotation of said information recording disk at said second rotation speed, write information associated with said write error in said second data area is recorded in blocks of said sectors within said second replacement area at said second rotation speed instead of within said second data area.

25. The method according to claim 24 wherein:
said first data area is closer to said center of rotation than said second data area, and
said first rotation speed is faster than said second rotation speed.

26. An information recording disk, having a plurality of tracks and a plurality of sectors on each of said tracks, said information recording disk being constructed and arranged to be rotated at one of a plurality of rotation speeds to record information, comprising:
a predetermined data area formed spirally or concentrically with a center of rotation of said information recording disk, in which said information is recorded when said information recording disk is rotated at a predetermined rotation speed;
a predetermined replacement area formed spirally or concentrically with said center of rotation of said information recording disk, in which, upon detecting a write error in said predetermined data area during rotation of said information recording disk at said predetermined rotation speed, write information associated with said write error is recorded in a block of said sectors within said predetermined replacement area at said predetermined rotation speed instead of within said predetermined data area; and
a defect list recorded on said information recording disk during initialization, said defect list comprising an address of a defective sector, said defective sector being skipped when writing said information to said information recording disk and said information associated with said defective sector being recorded into a next sector, not having a defect, on said information recording disk.

27. A method of performing replacement of write error information in an information recording disk rotated at a plurality of rotation speeds to record information, said information recording disk having a plurality of tracks on a surface thereof and a plurality of sectors in each of said tracks, said method comprising:
skipping a defective sector when writing said information to said information recording disk and writing said information associated with said defective sector in a next sector, not having a defect, on said information recording disk, an address of said defective sector being recorded in a defect list on said information recording disk during initialization of said information recording disk; and
performing replacement only in a predetermined replacement area for a write error generated in a predetermined data area, wherein:
said predetermined data area is formed spirally or concentrically with a center of rotation of said information recording disk, in which said information is recorded when said information recording disk is rotated at a predetermined rotation speed, and
said predetermined replacement area is formed spirally or concentrically with said center of rotation on a side closer to said center of rotation than said predetermined data, in which, upon detecting said write error during rotation of said information recording disk at said predetermined rotation speed, write information associated with said write error is recorded in a block of said sectors within said predetermined replacement area at said predetermined rotation speed instead of within said predetermined data area.

28. The method according to claim 27, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is located on a side closer to said center of rotation than said corresponding data area, said replacement areas being arranged such that a rotation speed for recording in each of said replacement areas is a same rotation speed for recording in said corresponding data area.

29. A method of performing replacement of write error information in an information recording disk rotated at a plurality of rotation speeds to record information, said information recording disk having a plurality of tracks on a surface thereof and a plurality of sectors in each of said tracks, said method comprising:

skipping a defective sector when writing said information to said information recording disk and writing said information associated with said defective sector in a next sector, not having a defect, on said information recording disk, an address of said defective sector being recorded in a defect list on said information recording disk during initialization of said information recording disk; and performing replacement only in a predetermined replacement area for a write error generated in a predetermined data area, wherein:

said predetermined data area is formed spirally or concentrically with a center of rotation of said information recording disk, in which said information is recorded when said information recording disk is rotated at a predetermined rotation speed, and said predetermined replacement area is formed spirally or concentrically with said center of rotation on a side farther from said center of rotation than said predetermined data, in which, upon detecting said write error during rotation of said information recording disk at said predetermined rotation speed, write information associated with said write error is recorded in a block of said sectors within said predetermined replacement area at said predetermined rotation speed instead of within said predetermined data area.

30. The method according to claim 29, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is located on a side farther from said center of rotation than said corresponding data area, said replacement areas being arranged such that a rotation speed for recording in each of said replacement areas is a same rotation speed for recording in said corresponding data area.

31. A method of performing replacement of write error information in an information recording disk rotated at a plurality of rotation speeds to record information, said information recording disk having a plurality of tracks on a surface thereof and a plurality of sectors in each of said tracks, said method comprising:

skipping a defective sector when writing said information to said information recording disk and writing said information associated with said defective sector in a next sector, not having a defect, on said information recording disk, an address of said defective sector being recorded in a defect list on said information recording disk during initialization of said information recording disk; and performing replacement only in a predetermined replacement area for a write error generated in a predetermined data area, wherein:

said predetermined data area is formed spirally or concentrically with a center of rotation of said information recording disk, in which said information is recorded when said information recording disk is rotated at a predetermined rotation speed, and said predetermined replacement area is formed spirally or concentrically with said center of rotation adjacent to said predetermined data, in which, upon detecting said write error during rotation of said information recording disk at said predetermined rotation speed, write information associated with said write error is recorded in a block of said sectors within said predetermined replacement area at said predetermined rotation speed instead of within said predetermined data area.

32. The method according to claim 31, wherein:

said predetermined data area is one of a plurality of data areas formed spirally or concentrically with a center of rotation of said information recording disk, said predetermined replacement area is one of a plurality of replacement areas formed spirally or concentrically with a center of rotation of said information recording disk, said plurality of data areas are arranged such that a rotation speed for recording in a data area is faster than another rotation speed for recording in another data area being located further from said center of rotation than said data area, and each of said replacement areas is associated with a corresponding data area and is located adjacent to said corresponding data area, said replacement areas being arranged such that a rotation speed for recording in each of said replacement areas is a same rotation speed for recording in said corresponding data area.

* * * * *